(12) United States Patent
Kwak et al.

(10) Patent No.: US 11,831,427 B2
(45) Date of Patent: Nov. 28, 2023

(54) TECHNIQUES TO INCREASE COVERAGE FOR LOW CAPABILITY USER EQUIPMENT

(71) Applicant: QUALCOMM Incorporated, San Diego, CA (US)

(72) Inventors: Yongjun Kwak, San Diego, CA (US); Jing Lei, San Diego, CA (US); Seyedkianoush Hosseini, San Diego, CA (US); Yuchul Kim, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/362,745

(22) Filed: Jun. 29, 2021

(65) Prior Publication Data

US 2022/0416936 A1 Dec. 29, 2022

(51) Int. Cl.
*H04L 1/00* (2006.01)
*H04L 5/00* (2006.01)
*H04W 72/23* (2023.01)
*H04W 72/51* (2023.01)

(52) U.S. Cl.
CPC .......... *H04L 1/0038* (2013.01); *H04L 5/0012* (2013.01); *H04L 5/0053* (2013.01); *H04W 72/23* (2023.01); *H04W 72/51* (2023.01)

(58) Field of Classification Search
CPC ... H04L 1/0038; H04L 5/0012; H04L 5/0053; H04L 1/00; H04L 5/0091; H04L 5/0055; H04W 72/23; H04W 72/51
See application file for complete search history.

(56) References Cited

U.S. PATENT DOCUMENTS

| | | | | |
|---|---|---|---|---|
| 2020/0187171 | A1* | 6/2020 | Hwang | .................. H04L 5/003 |
| 2021/0329647 | A1* | 10/2021 | Park | ..................... H04L 1/0038 |
| 2022/0039072 | A1* | 2/2022 | Babaei | .............. H04W 72/0446 |

FOREIGN PATENT DOCUMENTS

| | | | | |
|---|---|---|---|---|
| WO | WO-2019099435 | A1 * | 5/2019 | .......... H04L 5/0053 |
| WO | WO-2021231902 | A1 * | 11/2021 | |
| WO | WO-2022072506 | A1 * | 4/2022 | |
| WO | WO-2022080502 | A1 * | 4/2022 | |

OTHER PUBLICATIONS

Dahlman et al. 5G NR The next generation wireless access technology, 2020, Academic Press, second edition (Year: 2020).*

* cited by examiner

*Primary Examiner* — Ayaz R Sheikh
*Assistant Examiner* — David Zhijun Sun
(74) *Attorney, Agent, or Firm* — Holland & Hart LLP

(57) ABSTRACT

Methods, systems, and devices for wireless communications are described. In some examples, a reduced capability user equipment (UE) may receive signaling indicating a set of repetition levels for receiving control information from a base station and a blind detection threshold for decoding the control information. Upon receiving the signaling, the reduced capability UE may monitor a control channel candidate for the control information based on the set of repetition levels. Once the reduced capability UE detects the control information from the monitoring, the reduced capability UE may perform at least one blind detection on the control channel candidate based on the set of repetition levels and the blind detection threshold and receive the control information from the base station.

26 Claims, 16 Drawing Sheets

TECHNIQUES TO INCREASE COVERAGE FOR LOW CAPABILITY USER EQUIPMENT

TECHNICAL FIELD

The following relates to wireless communications, and more specifically to techniques to increase coverage for low capability user equipment (UE).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Components within a wireless communication system may be coupled (for example, operatively, communicatively, functionally, electronically, or electrically) to each other.

Some wireless communications systems may support reduced capability UEs. Reduced capability UEs may communicate via a smaller bandwidth in comparison to full-capability UEs.

SUMMARY

The described techniques relate to improved methods, systems, devices, and apparatuses that support techniques to increase coverage for low capability user equipment (UE). Generally, the described techniques provide for a UE to utilize control channel repetition techniques and frequency hopping techniques to enhance coverage. The UE may receive, from a base station, an indication of a set of repetition levels and a blind detection threshold. A repetition level may indicate a number of times that control information may be repeated in transmissions to the UE and the blind detection threshold may indicate the maximum number of times that the UE may perform blind detections on a CORESET used to receive the control information. The base station may transmit control information to the UE according to a repetition level of the set via a CORESET and the UE may perform iterative blind decoding (or blind detection) on the CORESET based on the set of repetition levels and the blind detection threshold to receive the control information. Additionally or alternatively, the UE may receive, from the base station, an indication of a frequency hopping pattern, where the frequency hopping pattern indicates an order in which to monitor for CORESETs of different frequency ranges. In some examples, the UE may switch from monitoring one CORESET to monitoring another CORESET based on the frequency hopping pattern.

Using the techniques as described herein may allow a reduced capability UE to increase coverage and more reliably receive control information from the base station.

A method for wireless communication at a UE is described. The method may include receiving signaling indicating a set of repetition levels for receiving downlink control signaling and a blind detection threshold for decoding the downlink control signaling, monitoring a control channel candidate of a CORESET for downlink control information (DCI), performing at least one blind detection on the control channel candidate to decode the DCI based on the set of repetition levels and the blind detection threshold, and receiving the DCI in accordance with the at least one blind detection.

An apparatus for wireless communication at a UE is described. The apparatus may include at least one processor, memory coupled with the at least one processor, and instructions stored in the memory. The instructions may be executable by the at least one processor to cause the UE to receive signaling indicating a set of repetition levels for receiving downlink control signaling and a blind detection threshold for decoding the downlink control signaling, monitor a control channel candidate of a CORESET for DCI, perform at least one blind detection on the control channel candidate to decode the DCI based on the set of repetition levels and the blind detection threshold, and receive the DCI in accordance with the at least one blind detection.

Another apparatus for wireless communication at a UE is described. The apparatus may include means for receiving signaling indicating a set of repetition levels for receiving downlink control signaling and a blind detection threshold for decoding the downlink control signaling, means for monitoring a control channel candidate of a CORESET for DCI, means for performing at least one blind detection on the control channel candidate to decode the DCI based on the set of repetition levels and the blind detection threshold, and means for receiving the DCI in accordance with the at least one blind detection.

A non-transitory computer-readable medium storing code for wireless communication at a UE is described. The code may include instructions executable by at least one processor to receive signaling indicating a set of repetition levels for receiving downlink control signaling and a blind detection threshold for decoding the downlink control signaling, monitor a control channel candidate of a CORESET for DCI, perform at least one blind detection on the control channel candidate to decode the DCI based on the set of repetition levels and the blind detection threshold, and receive the DCI in accordance with the at least one blind detection.

In some examples of the method, apparatuses, and non-transitory computer-readable medium described herein, performing the at least one blind detection on the control channel candidate may include operations, features, means, or instructions for performing a first blind detection on the control channel candidate and a second blind detection on the control channel candidate, where the first blind detection and the second blind detection may be associated with different repetition levels of the set of repetition levels.

In some examples of the method, apparatuses, and non-transitory computer-readable medium described herein, performing the at least one blind detection on the control channel candidate may include operations, features, means, or instructions for attempting to decode the control channel candidate by iterating through a set of blind decoding hypotheses for the control channel candidate, where a quantity of the blind decoding hypotheses may be limited by the blind detection threshold.

In some examples of the method, apparatuses, and non-transitory computer-readable medium described herein, each blind decoding hypothesis of the set of blind decoding hypotheses may be associated with a different subset of one or more repetition levels from the set of repetition levels.

In some examples of the method, apparatuses, and non-transitory computer-readable medium described herein, iterating through the set of blind decoding hypotheses may include operations, features, means, or instructions for skipping a subset of the set of blind decoding hypotheses associated with a corresponding subset of repetition levels when a quantity of blind decoding hypotheses attempted by the UE for the control channel candidate reaches the blind detection threshold.

In some examples of the method, apparatuses, and non-transitory computer-readable medium described herein, the corresponding subset of repetition levels may be a subset of lowest repetition levels of the set of repetition levels.

In some examples of the method, apparatuses, and non-transitory computer-readable medium described herein, the signaling indicating the set of repetition levels and the blind detection threshold includes radio resource control (RRC) signaling.

A method for wireless communication at a UE is described. The method may include receiving, from a base station, signaling indicating a set of repetition levels and a frequency hopping pattern for receiving DCI, monitoring a first CORESET of a first slot for the DCI, and monitoring a second CORESET of a second slot for the DCI in accordance with the set of repetition levels and the frequency hopping pattern, where the DCI is repeated in the first CORESET and the second CORESET according to a repetition level of the set of repetition levels, and where the first CORESET is within a first frequency range that is different from a second frequency range of the second CORESET according to the frequency hopping pattern.

An apparatus for wireless communication at a UE is described. The apparatus may include at least one processor, memory coupled with the at least one processor, and instructions stored in the memory. The instructions may be executable by the at least one processor to cause the UE to receive, from a base station, signaling indicating a set of repetition levels and a frequency hopping pattern for receiving DCI, monitor a first CORESET of a first slot for the DCI, and monitor a second CORESET of a second slot for the DCI in accordance with the set of repetition levels and the frequency hopping pattern, where the DCI is repeated in the first CORESET and the second CORESET according to a repetition level of the set of repetition levels, and where the first CORESET is within a first frequency range that is different from a second frequency range of the second CORESET according to the frequency hopping pattern.

Another apparatus for wireless communication at a UE is described. The apparatus may include means for receiving, from a base station, signaling indicating a set of repetition levels and a frequency hopping pattern for receiving DCI, means for monitoring a first CORESET of a first slot for the DCI, and means for monitoring a second CORESET of a second slot for the DCI in accordance with the set of repetition levels and the frequency hopping pattern, where the DCI is repeated in the first CORESET and the second CORESET according to a repetition level of the set of repetition levels, and where the first CORESET is within a first frequency range that is different from a second frequency range of the second CORESET according to the frequency hopping pattern.

A non-transitory computer-readable medium storing code for wireless communication at a UE is described. The code may include instructions executable by at least one processor to receive, from a base station, signaling indicating a set of repetition levels and a frequency hopping pattern for receiving DCI, monitor a first CORESET of a first slot for the DCI, and monitor a second CORESET of a second slot for the DCI in accordance with the set of repetition levels and the frequency hopping pattern, where the DCI is repeated in the first CORESET and the second CORESET according to a repetition level of the set of repetition levels, and where the first CORESET is within a first frequency range that is different from a second frequency range of the second CORESET according to the frequency hopping pattern.

Some examples of the method, apparatuses, and non-transitory computer-readable medium described herein may further include operations, features, means, or instructions for receiving, from the base station, an indication that a portion of a system bandwidth may be reserved for the first CORESET and the second CORESET.

Some examples of the method, apparatuses, and non-transitory computer-readable medium described herein may further include operations, features, means, or instructions for receiving, from the base station, an indication that the DCI may be mapped to the first CORESET or the second CORESET using a non-interleaved mapping technique and that resources associated with a first set of consecutive control channel element (CCE) indices may be allocated for the first CORESET and resources associated with a second set of consecutive CCE indices may be allocated for the second CORESET, where the allocation of the first CORESET and the second CORESET may be based on the non-interleaved mapping technique.

In some examples of the method, apparatuses, and non-transitory computer-readable medium described herein, the first CORESET and the second CORESET may be located at opposite ends of a frequency range associated with a system bandwidth.

Some examples of the method, apparatuses, and non-transitory computer-readable medium described herein may further include operations, features, means, or instructions for receiving, from the base station, a set of multiple demodulation reference signals (DMRSs) over the first CORESET or the second CORESET, the set of multiple DMRSs associated with a same precoder as a second set of multiple DMRSs associated with a third CORESET, the third CORESET spanning a frequency that may be greater than the first CORESET and the second CORESET.

Some examples of the method, apparatuses, and non-transitory computer-readable medium described herein may further include operations, features, means, or instructions for receiving, from the base station, an indication that the DCI may be mapped to the first CORESET or the second CORESET using an interleaved mapping technique and that resources associated with a first set of consecutive even CCE indices may be allocated for the first CORESET and resources associated with a second set of consecutive odd CCE indices may be allocated for the second CORESET, where the allocation of the first CORESET and the second CORESET may be based on the interleaved mapping technique.

Some examples of the method, apparatuses, and non-transitory computer-readable medium described herein may further include operations, features, means, or instructions for receiving, from the base station, a set of multiple DMRSs over the first CORESET or the second CORESET, the set of multiple DMRSs associated with a same precoder as a second set of multiple DMRSs associated with a third CORESET, the third CORESET spanning a frequency that may be greater than the first CORESET and the second CORESET.

Some examples of the method, apparatuses, and non-transitory computer-readable medium described herein may further include operations, features, means, or instructions for switching from monitoring the first CORESET in the first slot to monitoring the second CORESET in the second slot after a duration based on the frequency hopping pattern, the duration lasting from an end of the first CORESET to a start of the second slot.

In some examples of the method, apparatuses, and non-transitory computer-readable medium described herein, the signaling indicating the set of repetition levels and the frequency hopping pattern includes RRC signaling

DETAILED DESCRIPTION

In some examples, a wireless communications system may support reduced capability user equipment (UEs). Reduced-capability UEs may not support all of the functions that full capability UEs may support. For example, reduced capability UEs may have reduced peak throughput, latency, and reliability requirements when compared to full-capability UEs. An example of a reduced capability UE may be a superlight UE (e.g., a New Radio (NR) superlight UE). Examples of superlight UEs may be metering devices, asset tracking devices, personal Internet of Things (IoT) devices, and other devices that may support lower-power wide area use cases. Unlike other reduced capability UEs, superlight UEs may communicate over a bandwidth of less than 20 MHz and may be configured with a control resource set (CORESET) that spans 5 MHz in frequency. In some examples, the relatively small size of the CORESET allocated to a superlight UE may be difficult to detect and decode for low power use cases.

As described herein, a UE (e.g., a superlight UE) may support physical downlink control channel (PDCCH) repetition techniques and frequency hopping techniques to enhance or extend coverage of the UE. In one example, a base station may transmit control signaling to the UE indicating a set of repetition levels for receiving downlink control information (DCI) and a blind detection threshold for decoding the DCI. A repetition level may indicate the number of monitoring occasions over which the DCI may be repeated, and the blind detection threshold may indicate a maximum number of times the UE may perform blind detection on a given PDCCH candidate. The UE may monitor the PDCCH candidate for the DCI and decode the PDCCH candidate based on the set of repetition levels and the blind detection threshold.

Alternatively or additionally, the base station may transmit control signaling to the UE indicating a frequency hopping pattern for receiving DCI. The frequency hopping pattern may indicate an order of CORESETs for the UE to monitor for the DCI. In some examples, the frequency hopping may indicate for the UE to switch between CORESETs of different frequency ranges. The methods as described herein may allow for reduced capability UEs to increase or enhance coverage.

Aspects of the disclosure are initially described in the context of wireless communications systems. Additional aspects of the disclosure are described in the context of PDCCH repetition schemes, frequency hopping schemes, resource arrangements, and process flows. Aspects of the disclosure are further illustrated by and described with reference to apparatus diagrams, system diagrams, and flowcharts that relate to techniques to increase coverage for low capability UEs.

Figure 1:
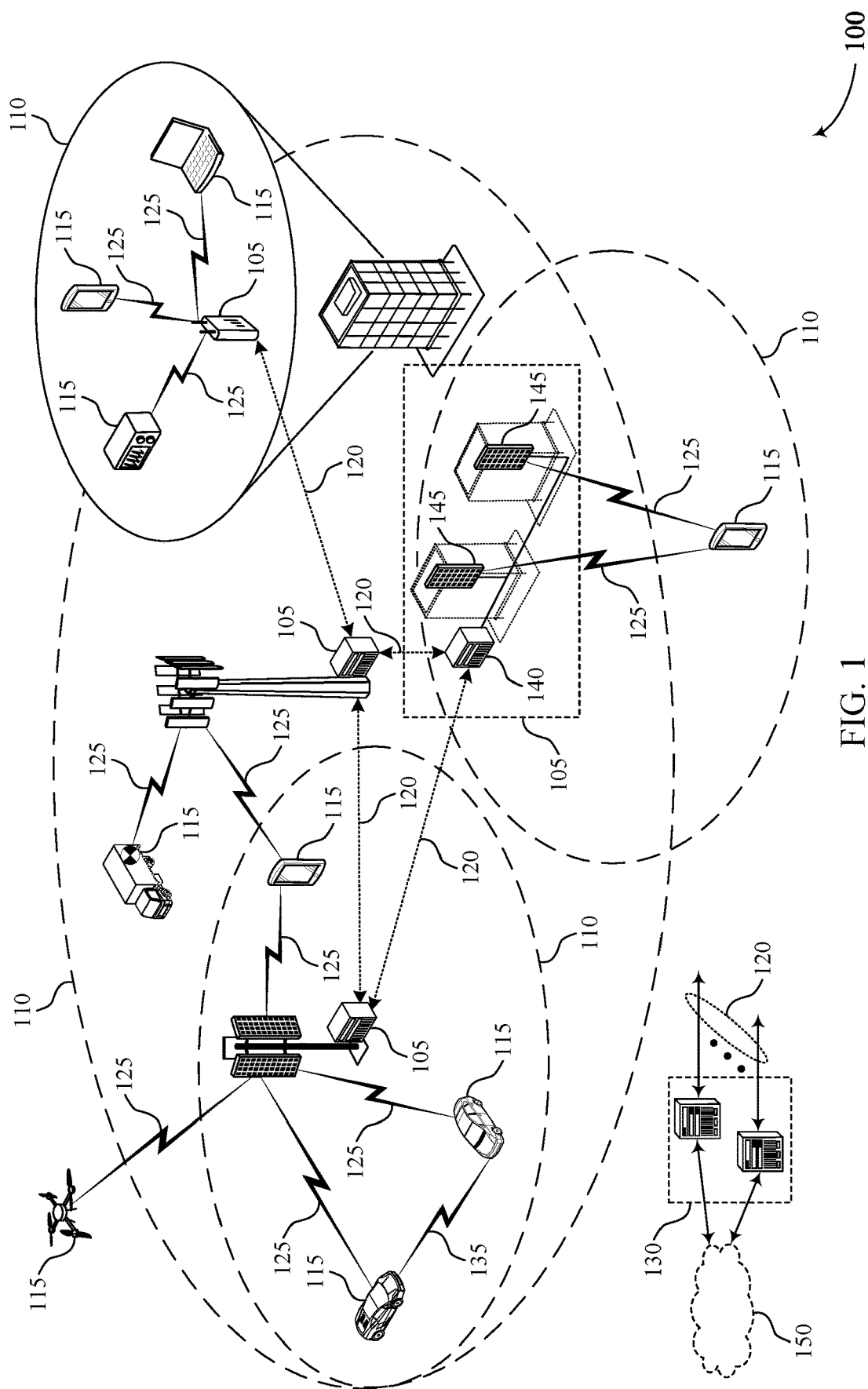
FIGS. 1 and 2 illustrate examples of a wireless communications system that supports techniques to increase coverage for low capability user equipment (UEs) in accordance with aspects of the present disclosure.

FIG. 1 illustrates an example of a wireless communications system 100 that supports techniques to increase coverage for low capability UEs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

As described herein, one or more UEs 115 in the wireless communications system may be an example of a reduced capability UE and may utilize control channel repetition techniques and frequency hopping techniques to enhance coverage. Such a UE 115 may receive, from a base station 105, an indication of a set of repetition levels, where each repetition level indicates a number of times that control information may be repeated by the base station 105, with each repetition corresponding to a separate slot or PDCCH candidate of a CORESET. The UE 115 may perform iterative blind decoding (or blind detection) on a CORESET based on the set of repetition levels and receive the control information. Additionally or alternatively, the UE 115 may receive, from the base station 105, an indication of a frequency hopping pattern, where the frequency hopping pattern indicates an order in which to monitor for CORESETs of different frequency ranges. In some examples, the UE 115 may switch from monitoring one CORESET to monitoring another CORESET based on the frequency hopping pattern. Using the techniques as described herein may allow a reduced capability UE to increase coverage and more reliably receive control information from the base station 105.

Figure 2:
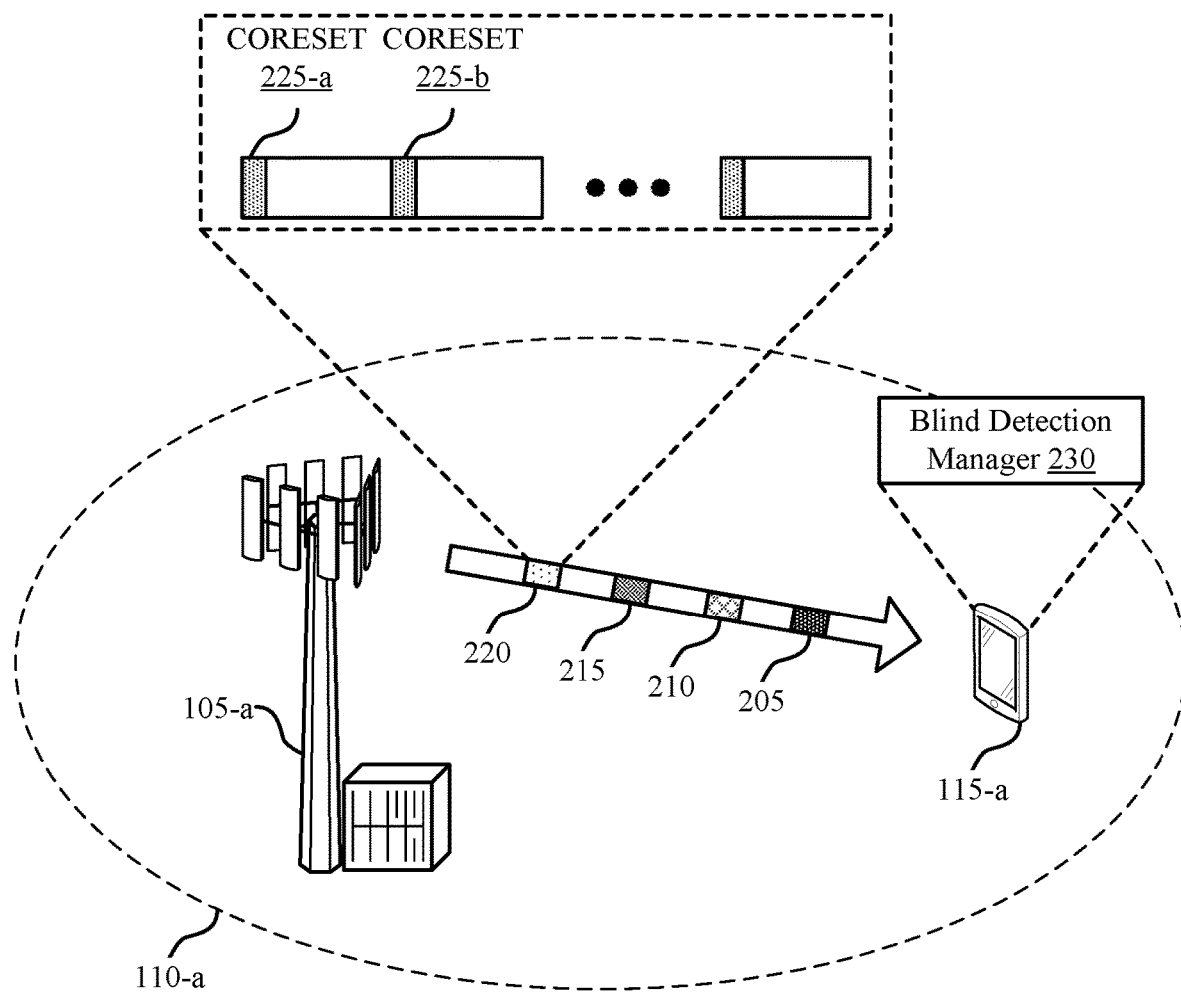

FIG. 2 illustrates an example of a wireless communications system 200 that supports techniques to increase coverage for low capability UEs in accordance with aspects of the present disclosure. The wireless communications system 200 may include a base station 105-a and a UE 115-a. In some examples, the wireless communications system 200 may implement aspects of a wireless communications system 100. For example, the base station 105-a and the UE 115-a may be examples of a base station 105 and a UE 115 as described with reference to FIG. 1. The base station 105-a and the UE 115-a may be located within a coverage area 110-a.

In some examples, the UE 115-a may be a reduced capability UE. Reduced capability UEs may not function in the same way that full capability UEs do. For example, reduced capability UEs may have reduced peak throughput, latency, and reliability requirements when compared to the full capability UEs. One example of a reduced capability UE may be a superlight UE (e.g., NR superlight UE). Superlight UEs may support low power wide area use cases and as such, may be designed specifically to maximize coverage while minimizing power consumption. Some examples of superlight UEs may be metering devices, asset tracking device, or personal IoT devices. The superlight UE may support a bandwidth less than 20 MHz whereas other UEs may support a bandwidth of 20 MHz or more (e.g., NR light UEs may support a bandwidth of 20 MHz and full-capability UEs may support a bandwidth of 100 MHz).

In some examples, the base station 105-a may transmit downlink control information (DCI) 220 to the UE 115-a. The DCI 220 may include scheduling information that the UE 115-a may utilize to receive data from or transmit data to the base station 105-a. Prior to receiving the DCI 220, the UE 115-a may receive control signaling indicating a CORESET 225. The CORESET 225 may be described as a set of resources used to receive the DCI 220 from the base station 105-a. To receive the DCI 220 from the base station 105-a, the UE 115-a may monitor multiple control channel candidates (e.g., PDCCH candidates) of the CORESET 225. Each control channel candidate may correspond to a different set of resources in the time domain. In some examples, each control channel candidate may correspond to a different slot.

A control channel candidate may be described as any location in the CORESET 225 that DCI 220 is expected and may be based on the aggregation level configured for the UE 115-a. If the UE 115-a is a reduced capability UE (e.g., NR superlight UE), the UE 115-a may support CORESETs 225 that span a frequency that is less than the system bandwidth. For example, the UE 115-a may support CORESETs 225 that span 5 MHz in the time domain and 3 consecutive symbols in the time domain allowing for 12 or 6 CCEs at a subcarrier spacing of 15 kHz or 30 kHz, respectively. But, the current CORESET design may not provide adequate coverage for reduced capability UEs, especially those designed for wide area low power use cases (e.g., NR superlight UEs). That is, reduced capability UEs may not reliably receive DCI 220 from the base station 105-a using the current CORESET design.

As described herein, coverage enhancement of reduced capability UEs may be achieved through control channel (e.g., PDCCH) repetition. In one example, the UE 115-a may receive control signaling (e.g., radio resource control (RRC) signaling) from the base station 105-a indicating a set of repetition levels 205 for receiving DCI 220 from the base station 105-a. A repetition level may correspond to a number of downlink control channel monitoring occasions that the DCI 220 may be repeated in. There may be one downlink control channel monitoring occasion per slot. In some examples, the set of repetition levels 205 may be 2 to the power of any value. For example, the set of repetition levels 205 may include a repetition level 2 and a repetition level 4. The base station 105-a may transmit DCI 220 according to one repetition level of the set. For example, the base station 105-a may transmit a DCI 220 according to a repetition level 2. That is, the base station 105-a may transmit the DCI 220 over resources of CORESET 225-a of a first slot and a repetition of the DCI 220 over resources of CORESET 225-b of a second slot to the UE 115-a.

To receive the DCI 220 from the base station 105-a, the UE 115-a may employ a blind detection manager 230. Using the blind detection manager 230, the UE 115-a may perform at least one blind detection on one or more control channel candidates of the CORESETs 225 based on the set of repetition levels 205. Blind detection may refer to a method in which a DCI 220 is decoded through iterative attempts to decode a control channel candidate. An initial transmission of a DCI 220 may by associated with a first type of blind detection and a retransmission of the DCI 220 may be associated with second type of blind detection. The blind detection types may differ between the initial transmission and the retransmission because decoding the retransmission includes an extra step of combining (e.g., combining the initial transmission of the DCI 220 with the retransmission of the DCI 220). Similarly, a second retransmission of the DCI 220 may be associated with a different type of blind detection. Because the UE 115-a may not have knowledge of the repetition level associated with a DCI 220, the UE 115-a may iteratively perform different types blind detection on the control channel candidate containing the DCI 220 until the DCI 220 is successfully decoded. In some examples, the UE 115-a may iteratively perform blind detections in the order of least complex to most complex. For example, the UE 115-a may perform non-combining blind detection followed by combining blind detection (e.g., combining two DCI 220 followed by combining three DCI 220 and so on).

As one example, the UE 115-a may be configured (for example, by RRC or media access control (MAC) control element (MAC-CE) signaling from the base station) with a set of repetition levels 205 including a repetition level 1 and a repetition level 2. The base station 105-a may select the repetition level 2 for a DCI 220 and initially transmit the DCI 220 over the CORESET 225-a. Using the blind detection manager 230, the UE 115-a may iteratively perform blind detection on the control candidate containing the DCI 220. If the UE 115-a performs blind decoding in order of complexity, the UE 115-a may stop after performing one type of blind detection (e.g., perform one blind detection) because the control channel candidate contains the first transmission of the DCI 220 and no combining is needed. The base station 105-a may then retransmit the DCI 220 over the CORESET 225-b. Using the blind detection manager 230, the UE 115-a may iteratively perform blind detection on the control channel candidate containing the retransmission of the DCI 220. If the UE 115-a performs blind detection in order of complexity, the UE 115-a may perform a first type of blind detection and a second type of blind detection. The first type of blind detection may not involve combining and as such, the first type of blind detection may fail. The second type of blind detection may involve combining and the UE 115-a may successfully decode the DCI 220 using the second type of blind detection.

Additionally, the base station 105-a may transmit control signaling (e.g., RRC signaling or MAC-CE signaling) indicating a blind detection threshold 210. The blind detection threshold 210 may limit the number of blind detections that the UE 115-a may perform on an individual control channel candidate. In one example, prior to performing blind detection on the control channel candidate, the UE 115-a may identify a quantity of blind detections to perform on the control channel candidate based on the set of repetition levels 205. The UE 115-a may know, from the set of repetition levels 205, which repetition of the DCI 220 to expect (e.g., either an initial transmission of the DCI, a first retransmission of the DCI, etc.) in the control channel candidate and as such, may identify the quantity of blind detections that may be performed on the control channel candidate. In some examples, different blind detections may correspond to different subsets of repetition levels. If the quantity of identified blind detections exceeds the blind detection threshold 210, the UE 115-a may perform the threshold quantity of identified blind detections and skip the rest of the identified blind detections. For example, the UE 115-a may identify that three blind detections and the blind detection threshold may be 2 blind detections. In such example, the UE 115-a may perform two of the identified blind detections on the control channel candidate and skip one of the identified blind detections. In some examples, the UE 115-a may skip blind detections that are the least complex (e.g., blind detections that correspond to the lowest repetition level of the set of repetition levels 205).

Additionally or alternatively, coverage enhancement of reduced capability UEs may be achieved through frequency hopping. For example, the base station 105-a may transmit control signaling (e.g., RRC signaling) indicating a frequency hopping pattern 215 for receiving DCI 220. In some examples, the frequency hopping pattern 215 may indicate a set of CORESETs 225 (e.g., 5 MHz CORESET) and an order to monitor each of the CORESETs 225 of the set. In some examples, the set of CORESET may include two or more CORESET that are associated with different frequency ranges. For example, the frequency hopping pattern 215 may indicate the CORESET 225-a corresponding to a first frequency range and a CORESET 225-a corresponding to a second frequency range, where the first frequency range and the second frequency range may not overlap one another. The frequency hopping pattern 215 may also indicate to monitor the CORESET 225-a followed by the CORESET 225-b. In some examples, the frequency hopping pattern 215 may include a sequence of CORESET IDs corresponding to each CORESET of the set and the UE 115-a may switch CORESETs according to the sequence. In some examples, there may be some delay between switching from one CORESET to another CORESET of the set. For example, the delay between the CORESET 225-a and the CORESET 225-b may last from the end of CORESET 225-a to beginning of the second slot. During this delay, the UE 115-a may retune the frequency.

In some examples, the UE 115-a may be an example of a reduced capability UE and may coexist with other UEs (e.g., full capability UEs). Full capability UEs may be configured with a CORESET that spans a frequency that is greater than the one or more CORESETs 225 configured for the reduced capability UE. As such, the base station 105-a may allocate resources for one or more CORESETs 225 considering the other UEs. As one example, the base station 105-a may reserve a portion of the system bandwidth for one or more CORESETs 225. That is, two or more 5 MHz bands may be blanked and reserved for the UE 115-a (e.g., the other UEs may not utilize these bands). As another example, the UE 115-a may share resources with the other UEs. That is, when UE 115-a is present, a portion of the system bandwidth may act as a CORESET 225 for the UE 115-a and when the UE 115-a is absent, the other UEs may utilize the portion of the system bandwidth. In some examples, the location of the CORESETs in the system bandwidth may be determined based on the type of mapping technique used to map the control information to the CORESETs 225 (e.g., interleaved mapping vs. non-interleaved mapping).

Figure 3:
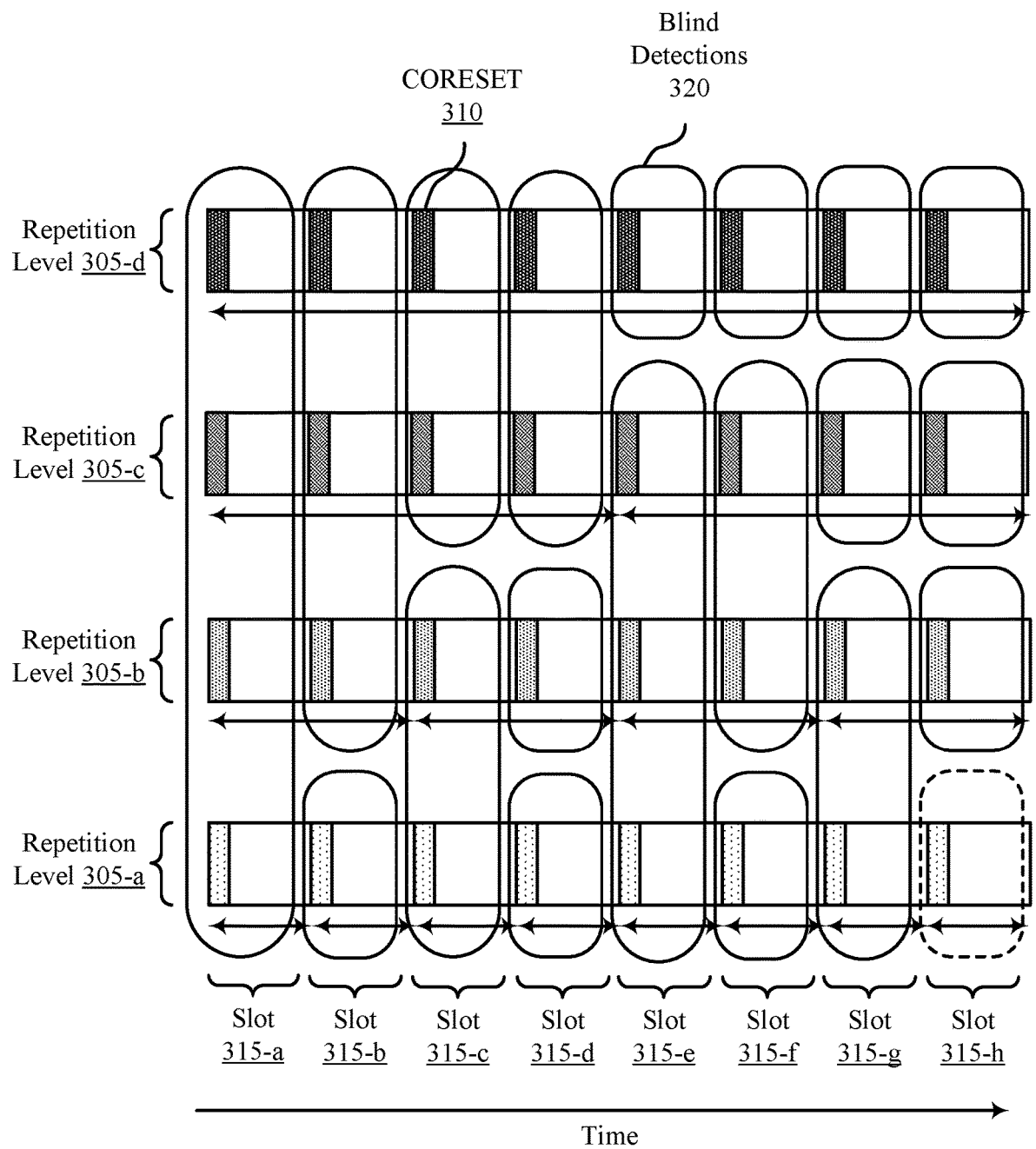
FIG. 3 illustrates an example of a physical downlink control channel (PDCCH) repetition scheme that supports techniques to increase coverage for low capability UEs in accordance with aspects of the present disclosure.

FIG. 3 illustrates an example of a PDCCH repetition scheme 300 that supports techniques to increase coverage for low capability UEs in accordance with aspects of the present disclosure. In some examples, the PDCCH repetition scheme 300 may implement aspects of a wireless communications system 100 and a wireless communications system 200.

As described with reference to FIG. 2, a wireless communications system may employ a control channel (PDCCH) repetition scheme to increase coverage at a reduced capability UE. To receive control information (e.g., DCI) from a base station, a reduced capability UE may monitor a CORESET 310, where the CORESET 310 may be repeated at the beginning of each slot 315 (e.g., slot 315-a, slot 315-b, slot 315-c, slot 315-d, slot 315-e, slot 315-f, slot 315-g, and slot 315-h). In some examples, prior to receiving control information from the base station, the UE may receive an indication of a set of repetition levels from the base station. The indication of the set of repetition levels may be included in RRC signaling. As shown in FIG. 3, the set of repetition levels may include a repetition level 305-a (repetition level 1), a repetition level 305-b (repetition level 2), a repetition level 305-c (repetition level 4), and a repetition level 305-d (repetition level 8). A repetition level may refer to the number of times that control information is repeated across different CORESETs 310. The base station may select a repetition level of the set of repetition levels and transmit control information according to the repetition level starting at slot 315-a. For example, the base station 105 may select the repetition level 305-b and repeatedly transmit the control information over the CORESET 310 of slot 315-a and the CORESET 310 of slot 315-b.

Because the UE may not have knowledge of the repetition level 305 selected by the base station, the UE may cycle through performing different blind detections 320 on the CORESET 310 to decode the control information from the base station, where the blind detections 320 may be based on the set of repetition levels 305. For example, the control information at slot 315-b may be a first retransmission of the control information (e.g., for a repetition level 305-b, a repetition level 305-c, and a repetition level 305-d) or an initial transmission of the control information (e.g., for a repetition level 305-a). As such, at slot 315-b, the UE may perform two blind detections 320, a first blind detection 320 that does not include combining (e.g., to account for if the base station selected the repetition level 305-a) and a second blind detection 320 that does include combining (e.g., to account for if the base station selected the repetition level 305-b, the repetition level 305-c, or the repetition level 305-d).

In some examples, the UE may limit the quantity of blind detections 320 performed on a control channel candidate of a CORESET 310 based on a blind detection threshold. Prior to receiving the control information from the base station, the UE may receive an indication of the blind detection threshold (e.g., via RRC signaling). The blind detection threshold may indicate a threshold quantity of blind detections 320 that the UE may perform for a given control channel candidate. As one example, the blind detection threshold may be 3 blind detections. At slot 315-h, the control information may be repeated 8 times (e.g., for repetition level 305-d), repeated 4 times (e.g., for repetition level 305-c), repeated 2 times (e.g., for repetition level 305-b), or repeated 1 time (e.g., for repetition level 305-a) depending on the repetition level 305 selected by the base station. As such, at slot 315-h, the UE may identify 4 blind detections 320. But because the blind detection threshold may be 3 blind detections, the UE may perform 3 of the identified blind detections 320 and skip 1 of the identified blind detections 320. In some examples, the UE may skip the blind detection 320 that is associated with the lowest repetition level of the set of repetition levels. For example, the UE may skip the blind detection 320 associated with repetition level 305-a (e.g., represented in FIG. 3 by a dotted line). Supporting control channel repetition as described herein may allow a wireless communication system in enhance coverage for low capability UEs.

Figure 4:
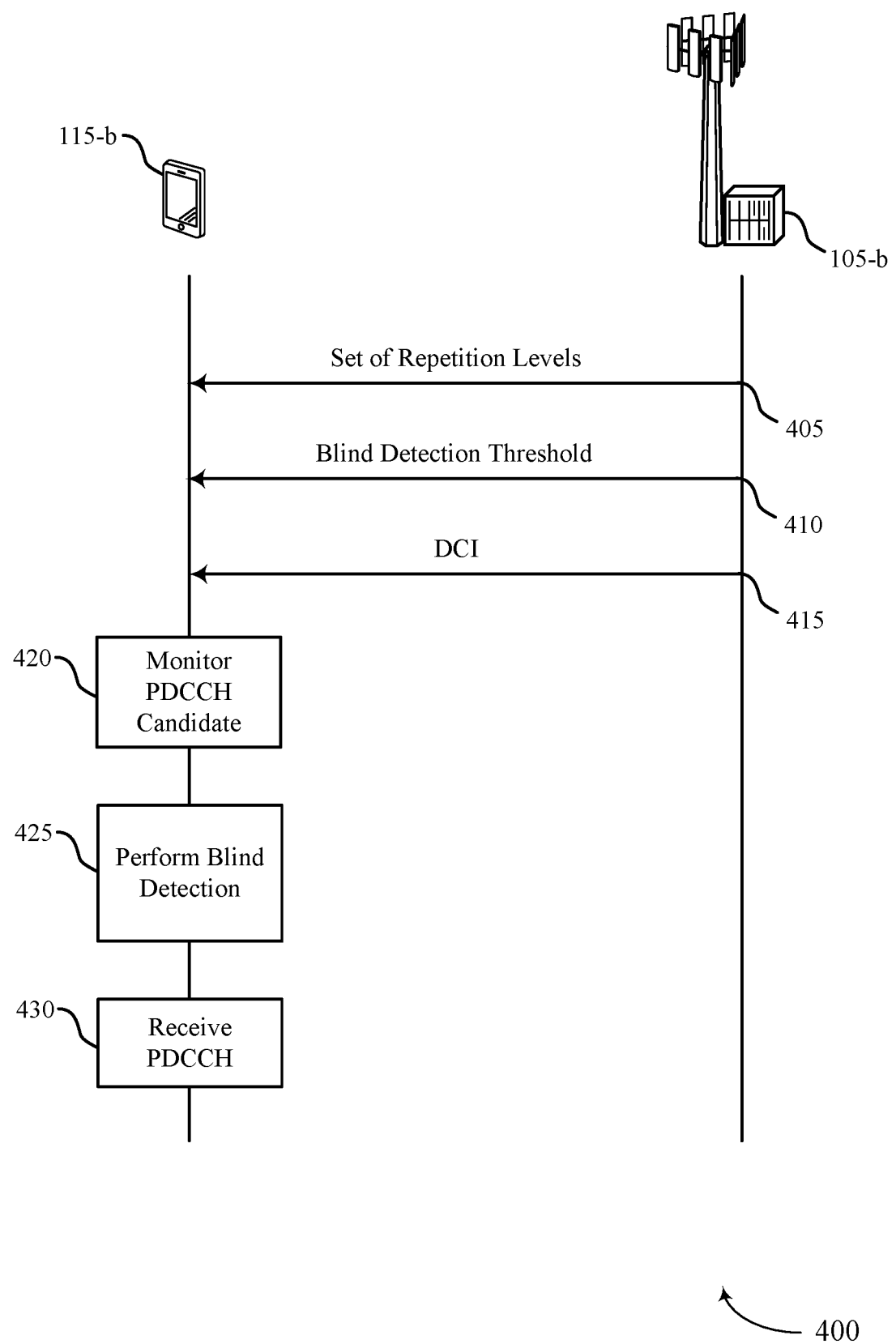
FIG. 4 illustrates an example of a process flow that supports techniques to increase coverage for low capability UEs in accordance with aspects of the present disclosure.

FIG. 4 illustrates an example of a process flow 400 that supports techniques to increase coverage for low capability UEs in accordance with aspects of the present disclosure. In some examples, the process flow 400 may implement or be implemented by aspects of a wireless communications system 100, a wireless communications system 200, and a PDCCH repetition scheme 300. For example, the process flow 400 may be implemented by a base station 105-b and a UE 115-b which may be examples of a base station 105 and a UE 115 as described with reference to FIGS. 1 and 2. Alternative examples of the following may be implemented, where some steps are performed in a different order then described or are not performed at all. In some cases, steps may include additional features not mentioned below, or further steps may be added.

At 405, the UE 115-b may receive an indication of a set of repetition levels from the base station 105-b. A repetition may refer to a number of downlink monitoring occasions that control information (e.g., PDCCH) from the base station 105-b may be repeated. In some examples, the set of repetition levels may be 2 to the power of any number (e.g., $2^n$). As one example, the indication of the set of repetition levels may be included in RRC signaling.

At 410, the UE 115-b may receive an indication of a blind detection threshold from the base station 105-b. The blind detection threshold may indicate a maximum number of blind detections that may be performed on a control channel candidate (e.g., PDCCH candidate) of a CORESET configured for the UE 115-b. In some examples, the indication of the blind detection threshold may be included in RRC signaling.

At 415, the base station 105-b may transmit DCI to the UE 115-b. In some examples, the base station 105-b may select a repetition level of the set of repetition levels and transmit the DCI according to the selected repetition level.

At 420, the UE 115-b monitor resources of one or more control channel candidate for the DCI from the base station 105-b.

At 425, the UE 115-b may perform blind detection on one or more control channel candidates to decode the DCI from the base station 105-b. In some examples, the UE 115-b may perform blind detection based at least in part on the set of repetition levels and the blind detection threshold. For example, the UE 115-a may determine a set of blind decoding hypotheses (e.g., possible set of blind detections) and iterate through the set of blind decoding hypothesis. In some examples, a quantity of blind decoding hypotheses included in the set of blind decoding hypotheses may exceed the blind detection threshold. In such example, the UE 115-b may skip a subset of the set of blind detections while performing blind detection on the control channel candidate. In some examples, the subset of the set of blind detections may be associated with the lowest repetition levels of the set of repetition levels.

At 430, the UE 115-a may receive the DCI from the base station 105-b. That is, the UE 115-a may identify scheduling information included in the DCI and communicate with the base station 105-b according to the scheduling information.

Figure 5:
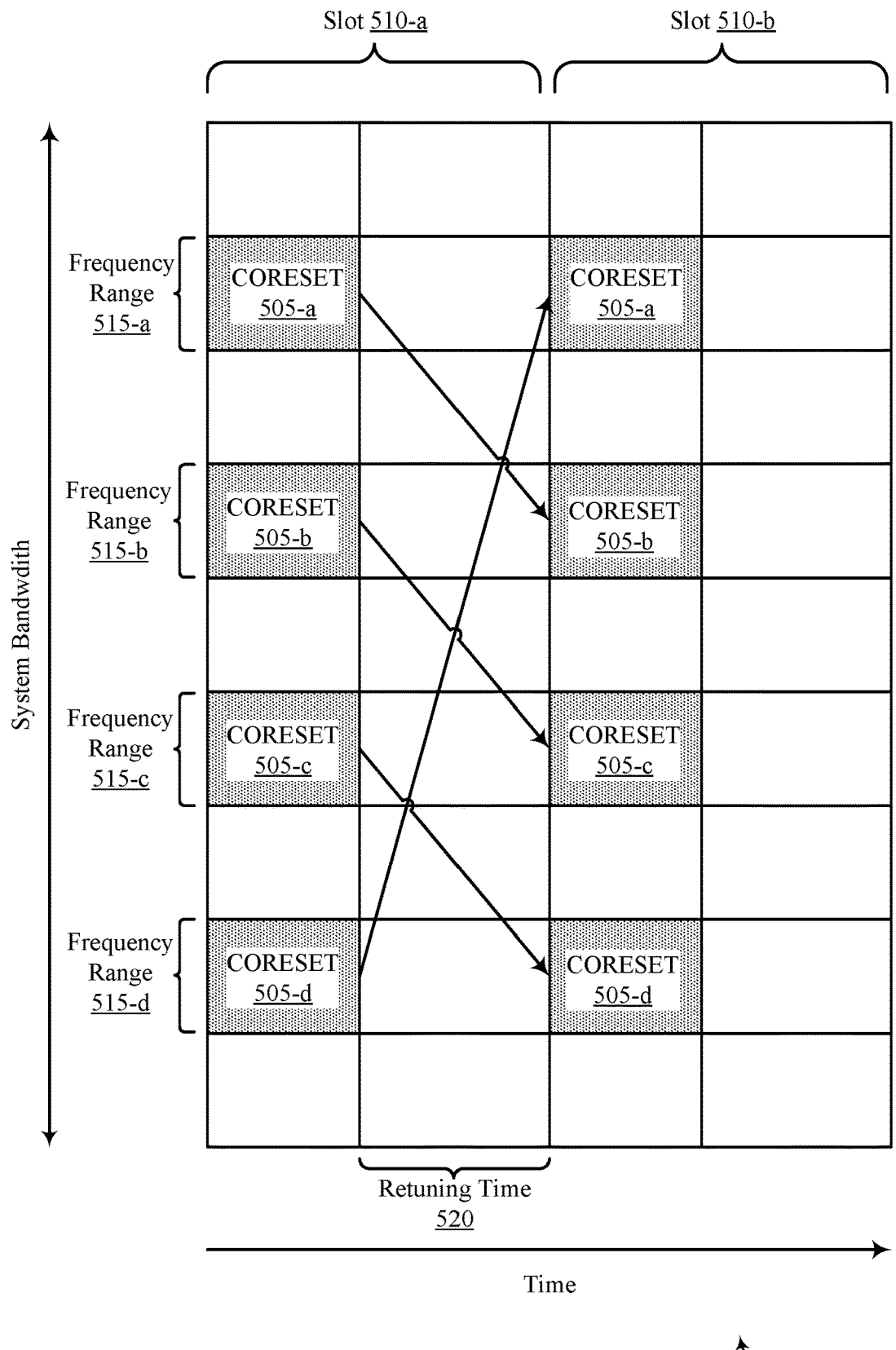
FIG. 5 illustrates an example of a frequency hopping scheme that supports techniques to increase coverage for low capability UEs in accordance with aspects of the present disclosure.

FIG. 5 illustrates an example of a frequency hopping scheme 500 that supports techniques to increase coverage for low capability UEs in accordance with aspects of the present disclosure. In some examples, the frequency hopping scheme 500 may implement aspects of a wireless communications system 100, a wireless communications system 200, a PDCCH repetition scheme 300, and a process flow 400.

As described with reference to FIG. 2, a wireless communications system may employ frequency hopping for receiving control information to enhance coverage of reduced capability UEs. In some examples, to receive control information from a base station, a UE may monitor a CORESET 505, where the CORESET 505 may be located at the beginning of a slot 510. In some examples, prior to receiving the control information from the base station, the base station may transmit control signaling indicting a set of candidate CORESETs 505 for the UE to potentially monitor for the control information. The set of candidate CORESETs 505 may include a CORESET 505-a, a CORESET 505-b, a CORESET 505-c, and a CORESET 505-d. Each CORESET of the set of CORESET may include resources of different frequency ranges 515. For example, the CORESETs 505-a, the CORESET 505-b, the CORESET 505-b, and the CORESET 505-d may correspond to a frequency range 515-a, a frequency range 515-b, a frequency range 515-c, and a frequency range 515-d, where the frequency range 515-a, the frequency range 515-b, the frequency range 515-c, and the frequency range 515-d may not overlap in frequency. In some examples, the size of the CORESETs 505 in the frequency domain may be 5 MHz. For each monitoring occasion (e.g., for each slot 510), the UE may monitor one of the set of candidate CORESETs 505.

Additionally, the UE may receive control signaling (e.g., RRC signaling) from a base station indicating a frequency hopping pattern. The frequency hopping pattern may indicate a CORESET 505 of the set of candidate CORESETs 505 for the UE to monitor for control information at a given time. As one example, the frequency hopping pattern may indicate to monitor the CORESET 505-a in slot 510-a and switch from monitoring the CORESET 505-a to monitoring the CORESET 505-b in slot 510-b. In some examples, the frequency hopping pattern may include a sequence of CORESET IDs corresponding to each of the CORESETs 505 of the set of candidate CORESETs 505 and the UE may monitor the CORESETs 505 according to the sequence. In order to switch from monitoring the CORESET 505-a of the frequency range 515-a to monitoring the CORESET 505-b of the frequency range 515-b, the UE may undergo frequency retuning. Frequency retuning may take place during the frequency retuning time 520. The frequency retuning time may span from the end of the CORESET 505-a of slot 510-a to the beginning of slot 510-b. In some examples, frequency hopping may be performed in combination with control channel repetition as described with reference to FIGS. 2 and 3.

FIG. 6 illustrates examples of a CORESET arrangement 600 (e.g., a CORESET arrangement 600-a, a CORESET arrangement 600-b, and a CORESET arrangement 600-c) that supports techniques to increase coverage for low capability UEs in accordance with aspects of the present disclosure. In some examples, the CORESET arrangement 600-a, the CORESET arrangement 600-b, and the CORESET arrangement 600-c may implement aspects of a wireless communications system 100, a wireless communications system 200, a PDCCH repetition scheme 300, a process flow 400, and a frequency hopping scheme 500.

Figure 6A:
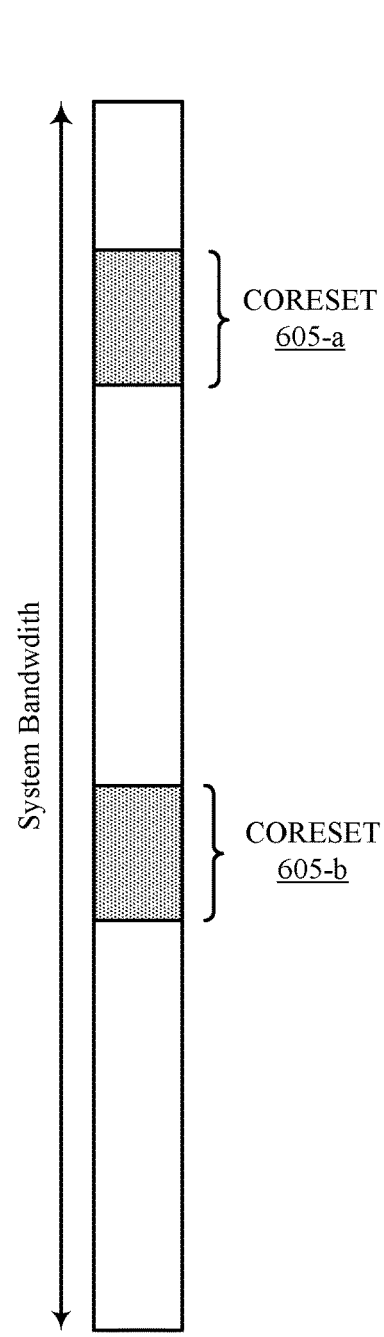
FIGS. 6A, 6B, and 6C illustrate examples of a control resource set (CORESET) arrangement that supports techniques to increase coverage for low capability UEs in accordance with aspects of the present disclosure.

FIG. 6A illustrates an example of a CORESET arrangement 600-a that supports techniques for coverage enhancement for low capability UEs in accordance with aspects of the present disclosure. As described with reference to FIG. 2, a reduced capability UE (e.g., NR superlight UE) may coexistence with full capability UEs. A base station may assign full capability UEs with a CORESET that is larger than a CORESET 605 configured for the reduced capability UE. In some examples, the CORESET allocated to the full capability UEs may span the system bandwidth. In one example, to facilitate the coexistence between the reduced capability UE and the full-capability UEs, the base station may physically split resources of the system bandwidth for one or more CORESETs 605 defined for reduced capability UEs. That is, the base station may assign the reduced capability UEs with one or more CORESETs 605 that span a portion (e.g., 5 MHz or 24 PRBs) of the system bandwidth and assign the full capability UEs with a CORESET that spans the remaining system bandwidth or a portion of the remaining system bandwidth.

In some examples, the reduced capability UE may support frequency hopping. To support frequency hopping techniques, the base station may assign the reduced capability UE with two or more CORESETs 605, where the two or more CORESETs 605 are associated with different frequency ranges. For example, the base station may assign the reduced capability UE with a CORESET 605-a that spans a first frequency range of the system bandwidth and a CORESET 605-b that spans a second frequency range of the system bandwidth, where the first frequency range does not overlap with the second frequency range. In some examples, the base station may indicate the two or more CORESETs 605 by transmitting a bitmap configuration of the two or more CORESETs 605. The two or more CORESETs may be reserved for use by the reduced capability UEs. That is, the base station may blank the resources of the two or more CORESETs 605 for the full-capability UEs and the full capability UEs may not utilize the resources of the two or more CORESET 605.

Figure 6B:
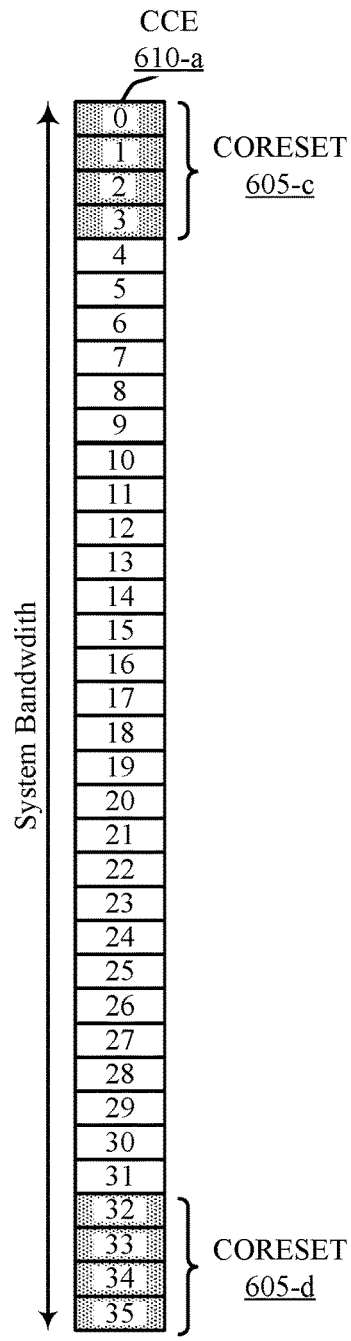

FIG. 6B illustrates an example of a CORESET arrangement 600-b that supports techniques for coverage enhancement for low capability UEs in accordance with aspects of the present disclosure. As described with reference to FIG. 2, a reduced capability UE (e.g., NR superlight UE) may coexistence with full capability UEs. A base station may assign full capability UEs with a CORESET that is larger than a CORESET 605 configured for the reduced capability UE. In some examples, the CORESET allocated to the full capability UE may span the system bandwidth (e.g., system CORESET). In one example, to facilitate the coexistence between the reduced capability UE and the full-capability UEs, the reduced capability UE and the full-capability UE may share the system CORESET in situation that interleaving is configured. That is, part of the system CORESET (e.g., 5 MHz or 26 PRB) may be used by the reduced capability UE. In some examples, if interleaving is not configured, the base station may physically split the system CORESET as described in FIG. 6A.

In some examples, the base station may map control information to the system CORESET in a non-interleaved manner. That is, the base station may map CCEs 610-a to consecutive resource element group (REG) bundles. In such example, the base station may assign the reduced capability UE with one or more CORESETs 605 located within the system CORESET, where the one or more CORESETs 605 include resources associated with a set of consecutive CCEs 610-a. If a reduced capability UE is present in a wireless communications system, the base station may map (e.g., using a non-interleaved mapping method) the control information intended for the reduced capability UE to resources of the one or more CORESETs 605 and map (e.g., using a non-interleaved mapping method) the control information intended for the full capability UE to resources of the remaining system CORESET or a portion of the remaining system CORESET. Alternatively, if the reduced capability UE is not present in the wireless communication system, the base station may map the control information intended for the full capability UE to resources of the system CORESET or a portion of the system CORESET.

In some examples, the reduced capability UE may support frequency hopping techniques as described in FIG. 4. To support frequency hopping techniques, the base station may assign the reduced capability UE with two or more CORESETs 605, where the two or more CORESETs 605 are associated with different frequency ranges. For example, the base station may assign the reduced capability UE with a CORESET 605-c that spans a first frequency range of the system bandwidth and a CORESET 605-d that spans a second frequency range of the system bandwidth, where the first frequency range does not overlap with the second frequency range. If the non-interleaved mapping is configured, the CORESET 605-c may include resources associated with a first set of consecutive CCEs 610-a and the CORESET 605-d may include resources associated with a second set of consecutive CCEs 610-a. In some examples, to minimize control channel blocking by the two or more CORESETs 605, the two or more CORESETs may include sets of consecutive CCEs, where the sets of consecutive CCEs are located at either end of the system bandwidth. For example, if the system bandwidth includes 216 REGs, the CORESET 605-c may include resources associated with CCEs of index 0-3 and the CORESET 605-d may include resources associated with CCEs of index 32-35.

In some examples, a wideband demodulation reference signal (DMRS) may be configured for the full capability UE. That is, the base station may transmit DMRSs corresponding to the control information intended for the full-capability UE in all contiguous REGs of the system CORESET. In such example, the base station may transmit one or more DMRSs over resources of the two or more CORESETs assigned to the reduced capability UE using the same precoder as DMRSs transmitted over resources of the system CORESET.

Figure 6C:
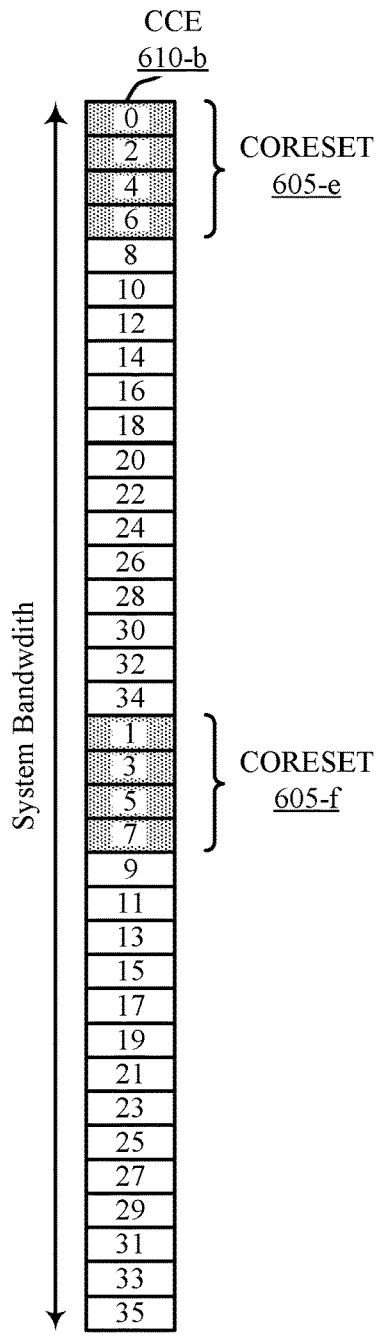

FIG. 6C illustrates an example of a CORESET arrangement 600-c that supports techniques for coverage enhancement for low capability UEs in accordance with aspects of the present disclosure. As described with reference to FIG. 2, a reduced capability UE (e.g., NR superlight UE) may coexistence with full capability UEs. A base station may assign full capability UEs with a CORESET that is larger than a CORESET 605 configured for the reduced capability UE. In some examples, the CORESET allocated to the full capability UE may span the system bandwidth (e.g., system CORESET). In one example, to facilitate the coexistence between the reduced capability UE and the full-capability UEs, the reduced capability UE and the full-capability UE may share the system CORESET in situations that interleaving is configured. That is, part of the system CORESET (e.g., 5 MHz or 26 PRB) may be used by the reduced capability UE. In some examples, if interleaving is not configured, the base station may physically split the system CORESET as described in FIG. 6A.

In some examples, the base station may map control information to the system CORESET in an interleaved manner. That is, the base station may map consecutive even CCEs 610-b to a first set of consecutive REG bundles and odd consecutive CCEs 610-b to a second set of consecutive REG bundles. In such example, the base station may assign the reduced capability UE with one or more CORESETs 605 located within the system CORESET, where the one or more CORESETs 605 include resources associated with a set of consecutive even or odd CCEs 610-a. If a reduced capability UE is present in a wireless communications system, the base station may map (e.g., using an interleaved mapping method) the control information intended for the reduced capability UE to resources of the one or more CORESETs 605 and map (e.g., using a an interleaved mapping method) the control information intended for the full capability UE to resources of the remaining system CORESET. Alternatively, if the reduced capability UE is not present in the wireless communication system, the base station may map the control information intended for the full capability UE to resources of the full system CORESET or a portion of the system CORESET.

In some examples, the reduced capability UE may support frequency hopping techniques as described in FIG. 4. To support frequency hopping techniques, the base station may assign the reduced capability UE with two or more CORESETs 605, where the two or more CORESETs 605 are associated with different frequency ranges. For example, the base station may assign the reduced capability UE with a CORESET 605-e that spans a first frequency range of the system bandwidth and a CORESET 605-f that spans a second frequency range of the system bandwidth, where the first frequency range does not overlap with the second frequency range. If the interleaved mapping is configured, the CORESET 605-e may include resources associated with a first set of even consecutive CCEs 610-b and the CORESET 605-f may include resources associated with a second set of odd consecutive CCEs 610-b. In some examples, to minimize control channel blocking by the two or more CORESETs 505, the two or more CORESETs may include sets of consecutive even or odd CCEs, where the sets of consecutive even or odd CCEs 610-b include a set of consecutive CCEs 610-b when combined. For example, if the system bandwidth includes 216 REGs, the CORESET 505-e may include resources associated with CCEs 610-b of index 0, 2, 4, and 6 and the CORESET 505-f may include resources associated with CCEs 610-b of index 1, 3, 5, and 7.

In some examples, a wideband DMRS may be configured for the full capability UE. That is, the base station may transmit DMRSs corresponding to the control information intended for the full-capability UE in all contiguous REGs of the system CORESET. In such example, the base station may transmit one or more DMRSs over resources of the two or more CORESETs 605 assigned to the reduced capability UE using the same precoder as DMRSs transmitted over resources of the system CORESET.

Figure 7:
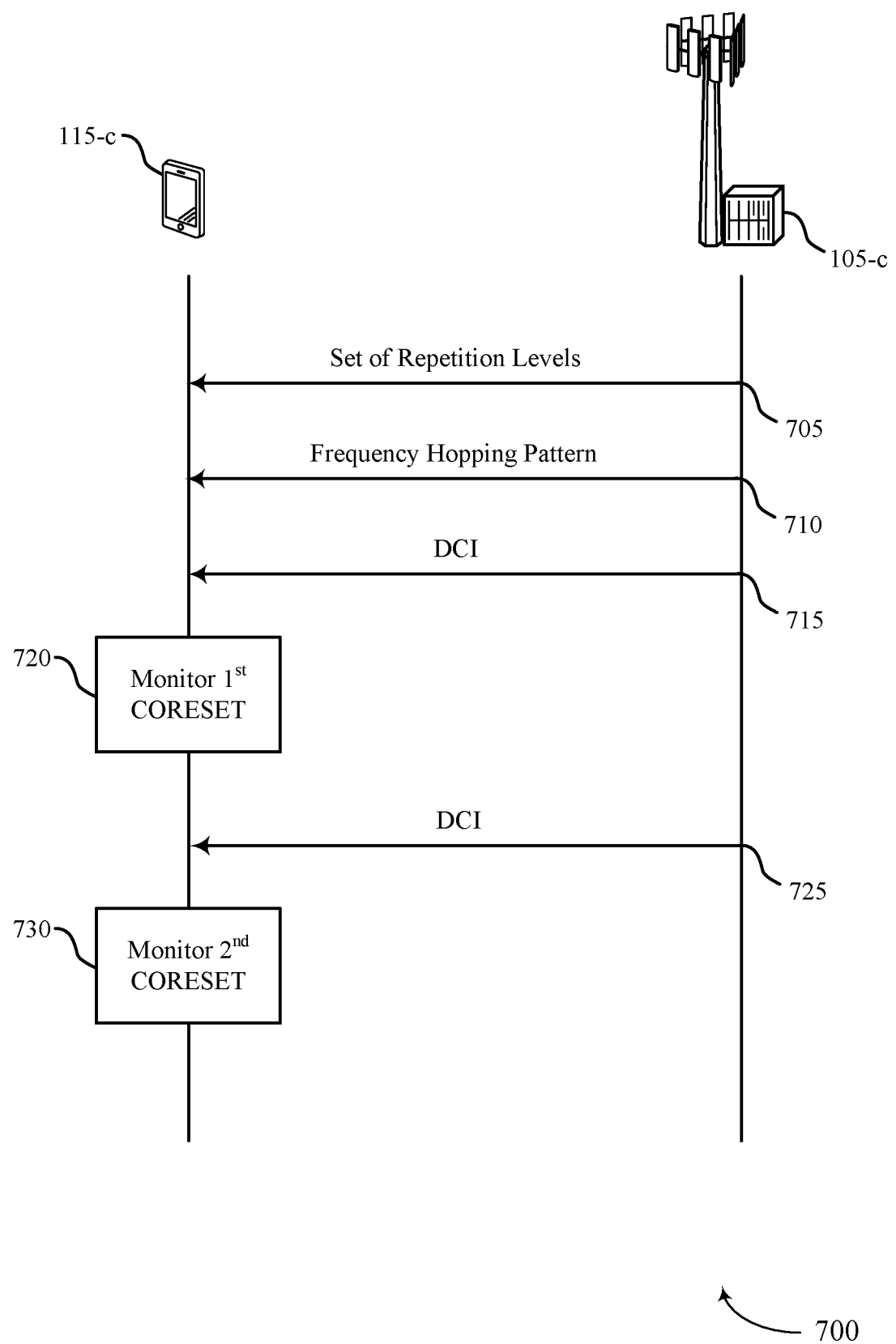
FIG. 7 illustrates an example of a process flow that supports techniques to increase coverage for low capability UEs in accordance with aspects of the present disclosure

FIG. 7 illustrates an example of a process flow 700 that supports techniques to increase coverage for low capability UEs in accordance with aspects of the present disclosure. In some examples, the process flow 700 may implement or be implemented by aspects of a wireless communications system 100, a wireless communications system 200, PDCCH repetition scheme 300, a process flow 400, frequency hopping scheme 500, and CORESET arrangement 600. For example, the process flow 700 may be implemented by a base station 105-c and a UE 115-c which may be examples of a base station 105 and a UE 115 as described with reference to FIGS. 1-3. Alternative examples of the following may be implemented, where some steps are performed in a different order then described or are not performed at all. In some cases, steps may include additional features not mentioned below, or further steps may be added.

At 705, the UE 115-c may receive an indication of a set of repetition levels from the base station 105-c. A repetition level may refer to a number of downlink monitoring occasions that control information (e.g., PDCCH) from the base station 105-b may be repeated. In some examples, the set of repetition levels may be 2 to the power of any number (e.g., $2^n$). As one example, the indication of the set of repetition levels may be included in RRC signaling At 710, the UE 115-c may receive an indication of a frequency hopping pattern from the base station 105-c. The frequency hopping pattern may indicate an order of CORESETs for the UE 115-c to monitor. In some examples, the indication of the frequency hopping pattern may be included in RRC signaling.

In some examples, the base station 105-a may transmit control signaling to the UE 115-c configuring the UE 115-c with two or more CORESETs. In some examples, each CORESET may be associated with a unique set of resources (e.g., each set of resources may be associated with a different frequency range). For example, the UE 115-c may be configured with a first CORESET including resources of a first frequency range and a second CORESET including resources of a second frequency range.

At 715, the base station 105-c may transmit DCI to the UE 115-c. In some examples, the base station 105-c may select a repetition level of the set of repetition levels and transmit the DCI according to the selected repetition level.

At 720, the UE 115-b may monitor the first CORESET of the two or more CORESETs configured by the base station 105-a for the DCI. The UE 115-b may monitor the first CORESET based on the frequency hopping pattern received at 710.

At 725, the base station 105-c may transmit DCI to the UE 115-c. In some examples, the base station 105-c may select a repetition level of the set of repetition levels and transmit the DCI according to the selected repetition level At 730, the UE 115-c may monitor a second CORESET of the two or more CORESETs configured by the base station 105-c for the DCI from the base station 105-c. In some examples, the UE 115-a may switch from monitoring the first CORESET at 720 to monitoring the second CORESET based on the frequency hopping scheme received at 710.

Figure 8:
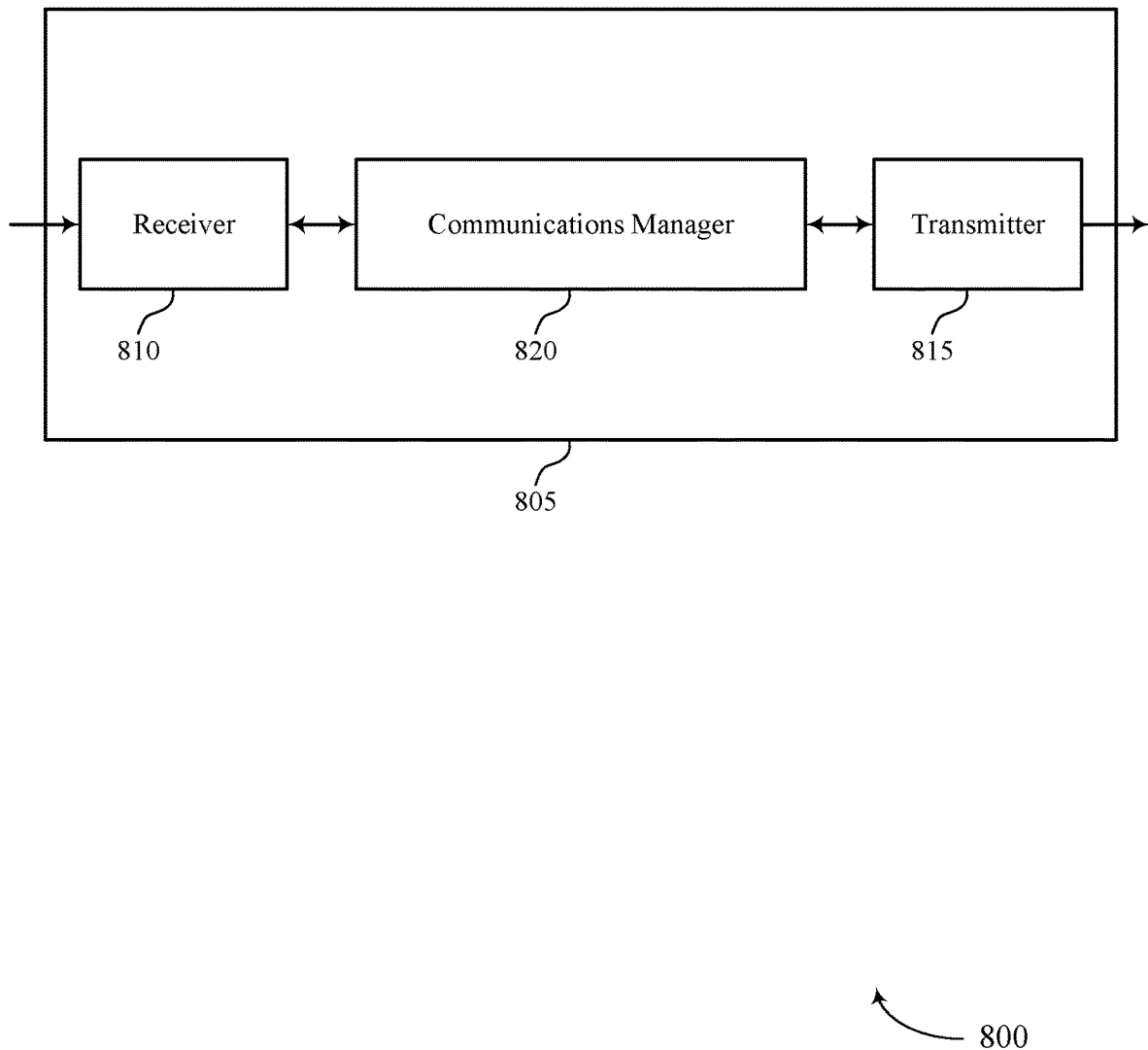
FIGS. 8 and 9 show block diagrams of devices that support techniques to increase coverage for low capability UEs in accordance with aspects of the present disclosure.

FIG. 8 shows a block diagram 800 of a device 805 that supports techniques to increase coverage for low capability UEs in accordance with aspects of the present disclosure. The device 805 may be an example of aspects of a UE 115 as described herein. The device 805 may include a receiver 810, a transmitter 815, and a communications manager 820. The device 805 may also include at least one processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques to increase coverage for low capability UEs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques to increase coverage for low capability UEs). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques to increase coverage for low capability UEs as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include at least one processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in hardware, software (e.g., executed by a processor), or any combination thereof. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving signaling indicating a set of repetition levels for receiving downlink control signaling and a blind detection threshold for decoding the downlink control signaling. The communications manager 820 may be configured as or otherwise support a means for monitoring a control channel candidate of a CORESET for DCI. The communications manager 820 may be configured as or otherwise support a means for performing at least one blind detection on the control channel candidate to decode the DCI based on the set of repetition levels and the blind detection threshold. The communications manager 820 may be configured as or otherwise support a means for receiving the DCI in accordance with the at least one blind detection.

Additionally or alternatively, the communications manager 820 may support wireless communication at a UE in accordance with examples as disclosed herein. For example, the communications manager 820 may be configured as or otherwise support a means for receiving, from a base station, signaling indicating a set of repetition levels and a frequency hopping pattern for receiving DCI. The communications manager 820 may be configured as or otherwise support a means for monitoring a first CORESET of a first slot for the DCI. The communications manager 820 may be configured as or otherwise support a means for monitoring a second CORESET of a second slot for the DCI in accordance with the set of repetition levels and the frequency hopping pattern, where the DCI is repeated in the first CORESET and the second CORESET according to a repetition level of the set of repetition levels, and where the first CORESET is within a first frequency range that is different from a second frequency range of the second CORESET according to the frequency hopping pattern.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced power consumption. Implementing control channel repetition techniques for coverage enhancement may allow the device 805 to conserve power when compared to other coverage enhancement techniques (e.g., increasing bandwidth supported by the device 805).

Figure 9:
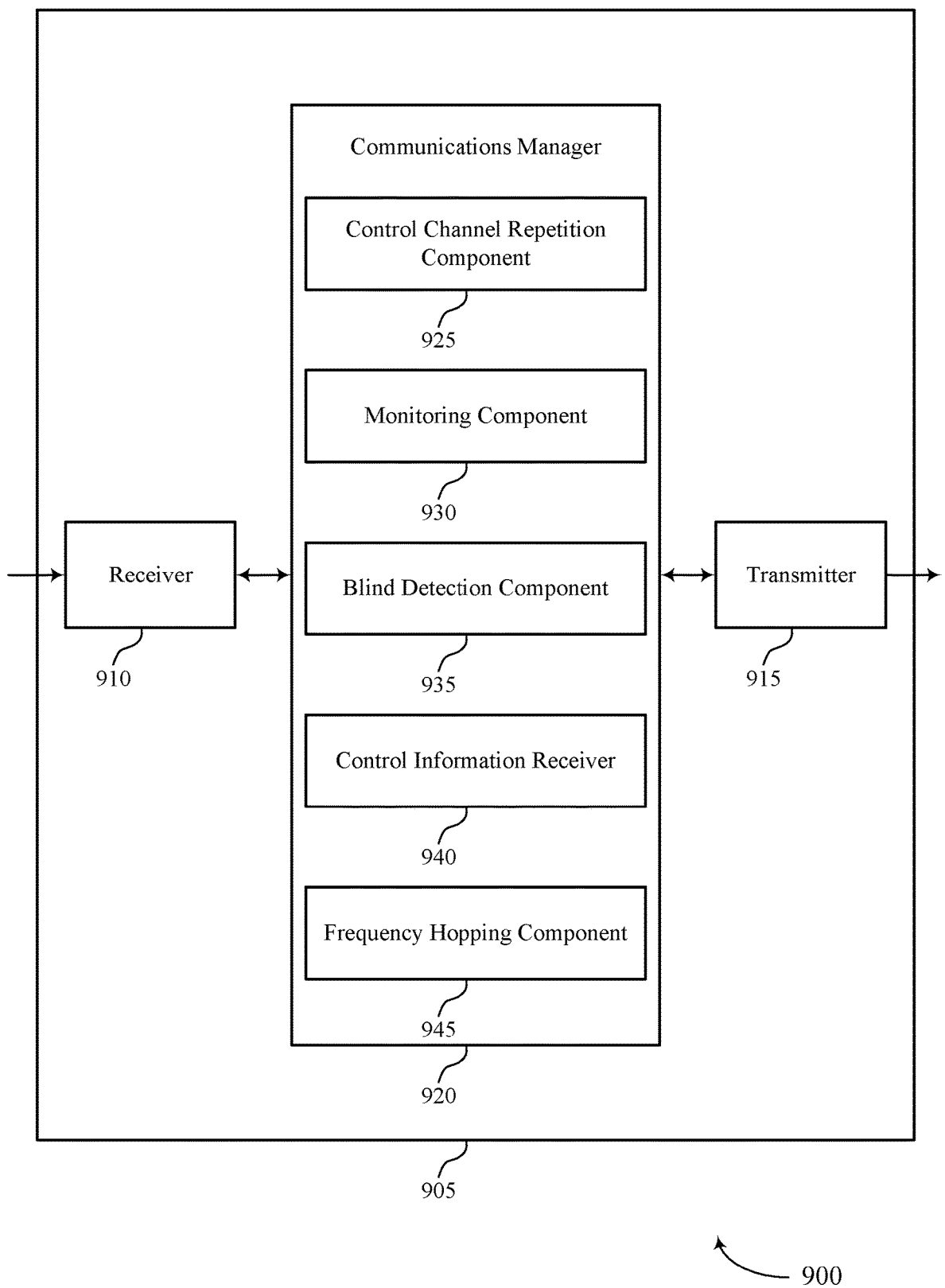

FIG. 9 shows a block diagram 900 of a device 905 that supports techniques to increase coverage for low capability UEs in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques to increase coverage for low capability UEs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques to increase coverage for low capability UEs). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques to increase coverage for low capability UEs as described herein. For example, the communications manager 920 may include a control channel repetition component 925, a monitoring component 930, a blind detection component 935, a control information receiver 940, a frequency hopping component 945, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The control channel repetition component 925 may be configured as or otherwise support a means for receiving signaling indicating a set of repetition levels for receiving downlink control signaling and a blind detection threshold for decoding the downlink control signaling. The monitoring component 930 may be configured as or otherwise support a means for monitoring a control channel candidate of a CORESET for DCI. The blind detection component 935 may be configured as or otherwise support a means for performing at least one blind detection on the control channel candidate to decode the DCI based on the set of repetition levels and the blind detection threshold. The control information receiver 940 may be configured as or otherwise support a means for receiving the DCI in accordance with the at least one blind detection.

Additionally or alternatively, the communications manager 920 may support wireless communication at a UE in accordance with examples as disclosed herein. The frequency hopping component 945 may be configured as or otherwise support a means for receiving, from a base station, signaling indicating a set of repetition levels and a frequency hopping pattern for receiving DCI. The monitoring component 930 may be configured as or otherwise support a means for monitoring a first CORESET of a first slot for the DCI. The monitoring component 930 may be configured as or otherwise support a means for monitoring a second CORESET of a second slot for the DCI in accordance with the set of repetition levels and the frequency hopping pattern, where the DCI is repeated in the first CORESET and the second CORESET according to a repetition level of the set of repetition levels, and where the first CORESET is within a first frequency range that is different from a second frequency range of the second CORESET according to the frequency hopping pattern.

Figure 10:
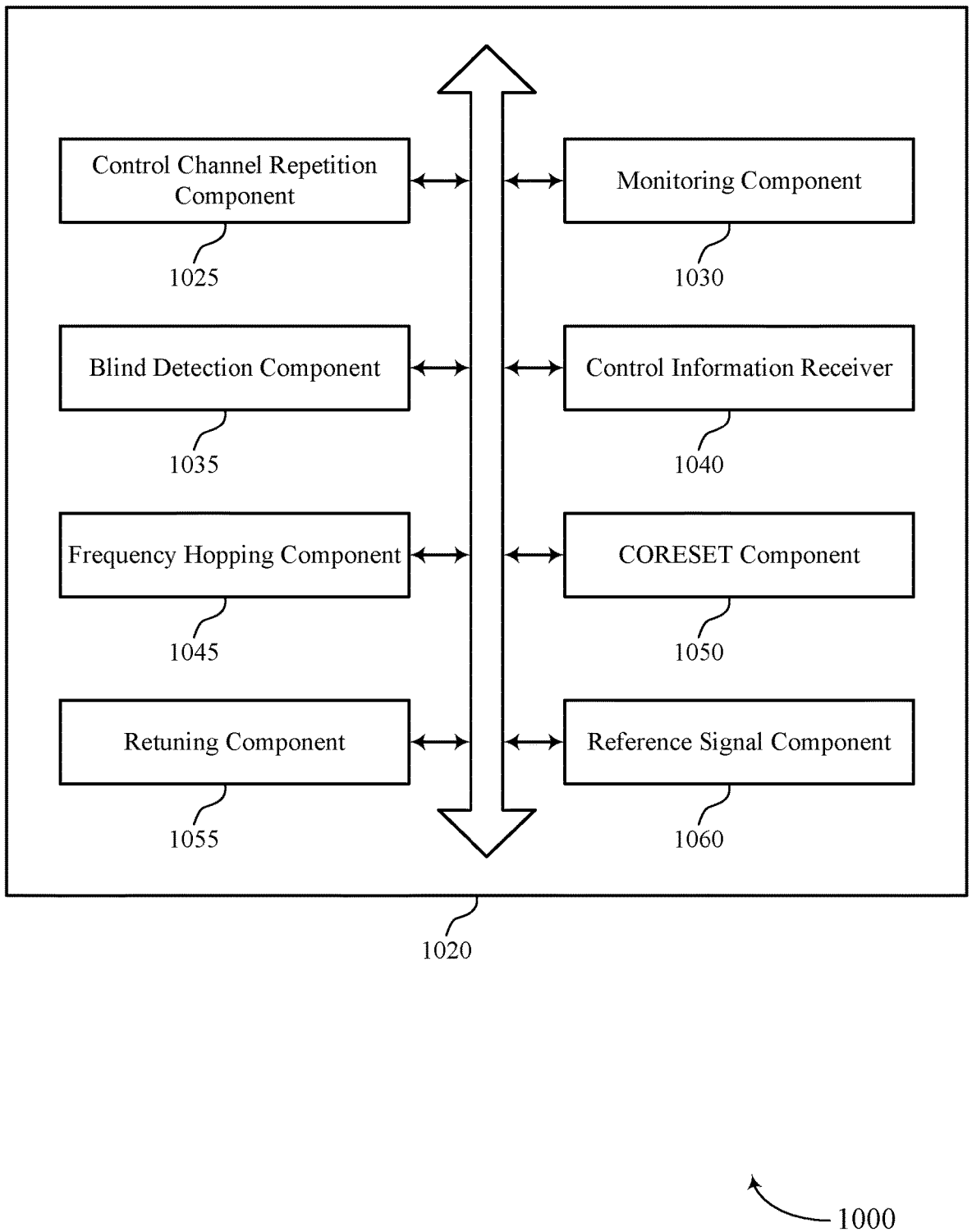
FIG. 10 shows a block diagram of a communications manager that supports techniques to increase coverage for low capability UEs in accordance with aspects of the present disclosure.

FIG. 10 shows a block diagram 1000 of a communications manager 1020 that supports techniques to increase coverage for low capability UEs in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques to increase coverage for low capability UEs as described herein. For example, the communications manager 1020 may include a control channel repetition component 1025, a monitoring component 1030, a blind detection component 1035, a control information receiver 1040, a frequency hopping component 1045, a CORESET component 1050, a retuning component 1055, a reference signal component 1060, or any combination thereof. Each of these components may communicate, directly or indirectly, with one another (e.g., via one or more buses).

The communications manager 1020 may support wireless communication at a UE in accordance with examples as disclosed herein. The control channel repetition component 1025 may be configured as or otherwise support a means for receiving signaling indicating a set of repetition levels for receiving downlink control signaling and a blind detection threshold for decoding the downlink control signaling. The monitoring component 1030 may be configured as or otherwise support a means for monitoring a control channel candidate of a CORESET for DCI. The blind detection component 1035 may be configured as or otherwise support a means for performing at least one blind detection on the control channel candidate to decode the DCI based on the set of repetition levels and the blind detection threshold. The control information receiver 1040 may be configured as or otherwise support a means for receiving the DCI in accordance with the at least one blind detection.

In some examples, to support performing the at least one blind detection on the control channel candidate, the blind detection component 1035 may be configured as or otherwise support a means for performing a first blind detection on the control channel candidate and a second blind detection on the control channel candidate, where the first blind detection and the second blind detection are associated with different repetition levels of the set of repetition levels.

In some examples, to support performing the at least one blind detection on the control channel candidate, the blind detection component 1035 may be configured as or otherwise support a means for attempting to decode the control channel candidate by iterating through a set of blind decoding hypotheses for the control channel candidate, where a quantity of the blind decoding hypotheses is limited by the blind detection threshold.

In some examples, each blind decoding hypothesis of the set of blind decoding hypotheses is associated with a different subset of one or more repetition levels from the set of repetition levels.

In some examples, to support iterating through the set of blind decoding hypotheses, the blind detection component 1035 may be configured as or otherwise support a means for skipping a subset of the set of blind decoding hypotheses associated with a corresponding subset of repetition levels when a quantity of blind decoding hypotheses attempted by the UE for the control channel candidate reaches the blind detection threshold.

In some examples, the corresponding subset of repetition levels is a subset of lowest repetition levels of the set of repetition levels. In some examples, the signaling indicating the set of repetition levels and the blind detection threshold includes RRC signaling.

Additionally or alternatively, the communications manager 1020 may support wireless communication at a UE in accordance with examples as disclosed herein. The frequency hopping component 1045 may be configured as or otherwise support a means for receiving, from a base station, signaling indicating a set of repetition levels and a frequency hopping pattern for receiving DCI. In some examples, the monitoring component 1030 may be configured as or otherwise support a means for monitoring a first CORESET of a first slot for the DCI. In some examples, the monitoring component 1030 may be configured as or otherwise support a means for monitoring a second CORESET of a second slot for the DCI in accordance with the set of repetition levels and the frequency hopping pattern, where the DCI is repeated in the first CORESET and the second CORESET according to a repetition level of the set of repetition levels, and where the first CORESET is within a first frequency range that is different from a second frequency range of the second CORESET according to the frequency hopping pattern.

In some examples, the CORESET component 1050 may be configured as or otherwise support a means for receiving, from the base station, an indication that a portion of a system bandwidth is reserved for the first CORESET and the second CORESET.

In some examples, the CORESET component 1050 may be configured as or otherwise support a means for receiving, from the base station, an indication that the DCI is mapped to the first CORESET or the second CORESET using a non-interleaved mapping technique and that resources associated with a first set of consecutive CCE indices are allocated for the first CORESET and resources associated with a second set of consecutive CCE indices are allocated for the second CORESET, where the allocation of the first CORESET and the second CORESET is based on the non-interleaved mapping technique.

In some examples, the first CORESET and the second CORESET are located at opposite ends of a frequency range associated with a system bandwidth.

In some examples, the reference signal component 1060 may be configured as or otherwise support a means for receiving, from the base station, a set of multiple demodulation reference signals over the first CORESET or the second CORESET, the set of multiple demodulation reference signals associated with a same precoder as a second set of multiple demodulation reference signals associated with a third CORESET, the third CORESET spanning a frequency that is greater than the first CORESET and the second CORESET.

In some examples, the CORESET component 1050 may be configured as or otherwise support a means for receiving, from the base station, an indication that the DCI is mapped to the first CORESET or the second CORESET using an interleaved mapping technique and that resources associated with a first set of consecutive even CCE indices are allocated for the first CORESET and resources associated with a second set of consecutive odd CCE indices are allocated for the second CORESET, where the allocation of the first CORESET and the second CORESET is based on the interleaved mapping technique.

In some examples, the reference signal component 1060 may be configured as or otherwise support a means for receiving, from the base station, a set of multiple demodulation reference signals over the first CORESET or the second CORESET, the set of multiple demodulation reference signals associated with a same precoder as a second set of multiple demodulation reference signals associated with a third CORESET, the third CORESET spanning a frequency that is greater than the first CORESET and the second CORESET.

In some examples, the retuning component 1055 may be configured as or otherwise support a means for switching from monitoring the first CORESET in the first slot to monitoring the second CORESET in the second slot after a duration based on the frequency hopping pattern, the duration lasting from an end of the first CORESET to a start of the second slot.

In some examples, the signaling indicating the set of repetition levels and the frequency hopping pattern includes RRC signaling.

Figure 11:
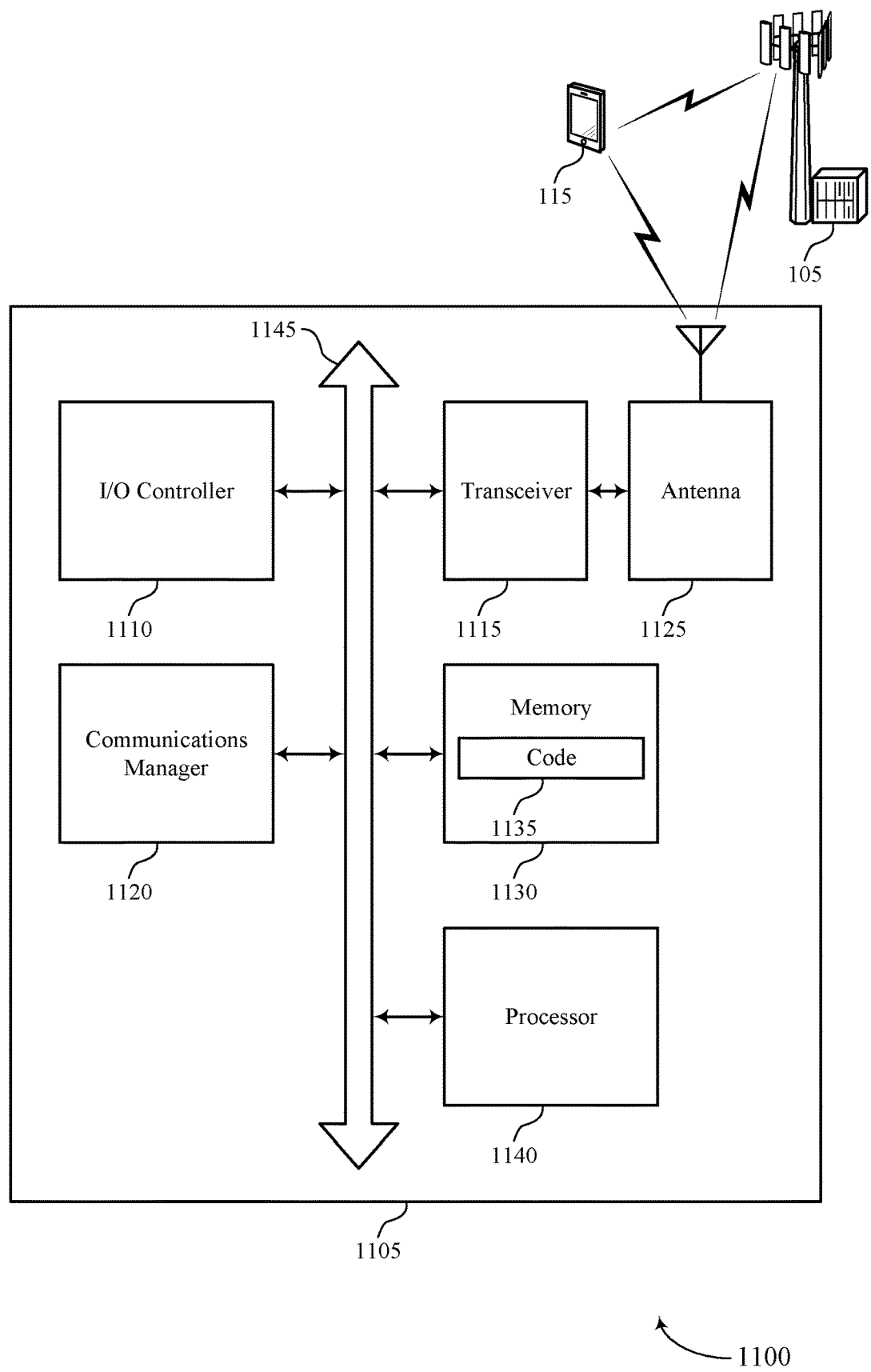
FIG. 11 shows a diagram of a system including a device that supports techniques to increase coverage for low capability UEs in accordance with aspects of the present disclosure.

FIG. 11 shows a diagram of a system 1100 including a device 1105 that supports techniques to increase coverage for low capability UEs in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques to increase coverage for low capability UEs). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving signaling indicating a set of repetition levels for receiving downlink control signaling and a blind detection threshold for decoding the downlink control signaling. The communications manager 1120 may be configured as or otherwise support a means for monitoring a control channel candidate of a CORESET for DCI. The communications manager 1120 may be configured as or otherwise support a means for performing at least one blind detection on the control channel candidate to decode the DCI based on the set of repetition levels and the blind detection threshold. The communications manager 1120 may be configured as or otherwise support a means for receiving the DCI in accordance with the at least one blind detection.

Additionally or alternatively, the communications manager 1120 may support wireless communication at a UE in accordance with examples as disclosed herein. For example, the communications manager 1120 may be configured as or otherwise support a means for receiving, from a base station, signaling indicating a set of repetition levels and a frequency hopping pattern for receiving DCI. The communications manager 1120 may be configured as or otherwise support a means for monitoring a first CORESET of a first slot for the DCI. The communications manager 1120 may be configured as or otherwise support a means for monitoring a second CORESET of a second slot for the DCI in accordance with the set of repetition levels and the frequency hopping pattern, where the DCI is repeated in the first CORESET and the second CORESET according to a repetition level of the set of repetition levels, and where the first CORESET is within a first frequency range that is different from a second frequency range of the second CORESET according to the frequency hopping pattern.

By including or configuring the communications manager 1120 in accordance with examples as described herein, the device 1105 may support techniques for improved communication reliability and longer battery life. A device 1105 implementing channel repetition techniques as described herein may combine repetitions of a transmission (e.g., control information) which may increase communication reliability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques to increase coverage for low capability UEs as described herein, or the processor 1140 and the memory 1130 may be otherwise configured to perform or support such operations.

Figure 12:
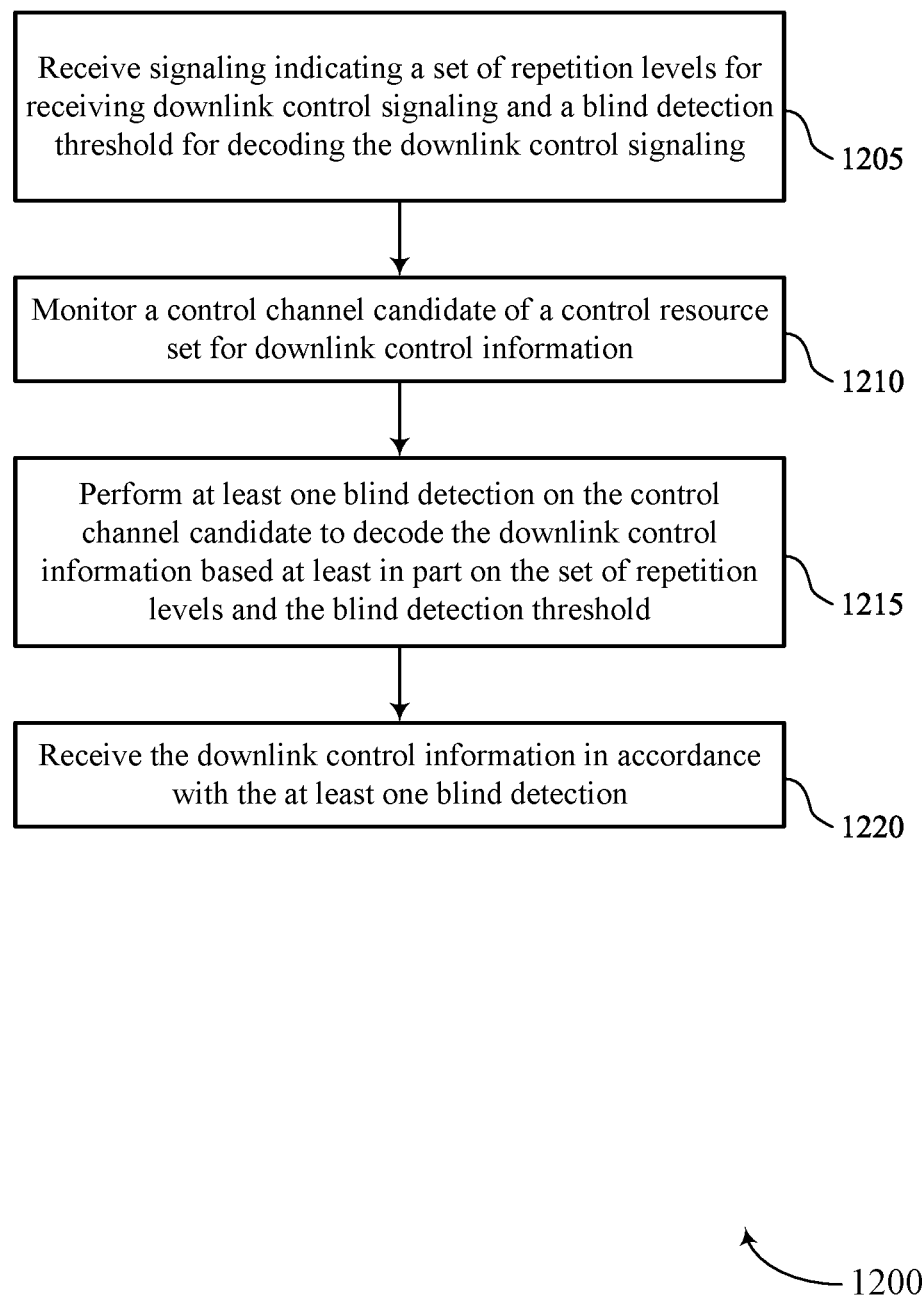
FIGS. 12 through 16 show flowcharts illustrating methods that support techniques to increase coverage for low capability UEs in accordance with aspects of the present disclosure.

FIG. 12 shows a flowchart illustrating a method 1200 that supports techniques to increase coverage for low capability UEs in accordance with aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1205, the method may include receiving signaling indicating a set of repetition levels for receiving downlink control signaling and a blind detection threshold for decoding the downlink control signaling. The operations of 1205 may be performed in accordance with examples as disclosed herein. In some examples, aspects of the operations of 1205 may be performed by a control channel repetition component 1025 as described with reference to FIG. 10.

At 1210, the method may include monitoring a control channel candidate of a CORESET for DCI. The operations of 1210 may be performed in accordance with examples as disclosed herein. In some examples, aspects of the operations of 1210 may be performed by a monitoring component 1030 as described with reference to FIG. 10.

At 1215, the method may include performing at least one blind detection on the control channel candidate to decode the DCI based at least in part on the set of repetition levels and the blind detection threshold. The operations of 1215 may be performed in accordance with examples as disclosed herein. In some examples, aspects of the operations of 1215 may be performed by a blind detection component 1035 as described with reference to FIG. 10.

At 1220, the method may include receiving the DCI in accordance with the at least one blind detection. The operations of 1220 may be performed in accordance with examples as disclosed herein. In some examples, aspects of the operations of 1220 may be performed by a control information receiver 1040 as described with reference to FIG. 10.

Figure 13:
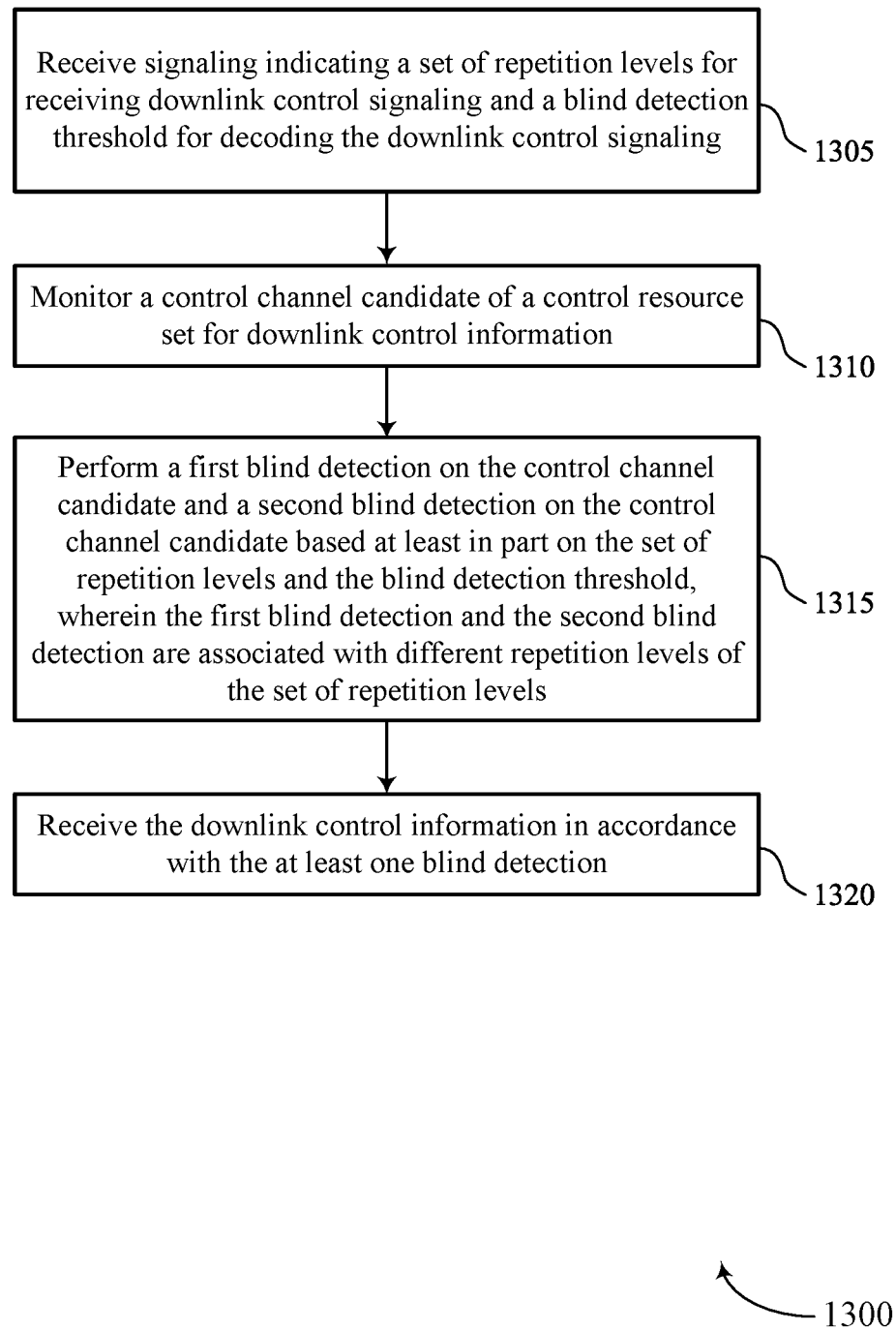

FIG. 13 shows a flowchart illustrating a method 1300 that supports techniques to increase coverage for low capability UEs in accordance with aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1305, the method may include receiving signaling indicating a set of repetition levels for receiving downlink control signaling and a blind detection threshold for decoding the downlink control signaling. The operations of 1305 may be performed in accordance with examples as disclosed herein. In some examples, aspects of the operations of 1305 may be performed by a control channel repetition component 1025 as described with reference to FIG. 10.

At 1310, the method may include monitoring a control channel candidate of a CORESET for DCI. The operations of 1310 may be performed in accordance with examples as disclosed herein. In some examples, aspects of the operations of 1310 may be performed by a monitoring component 1030 as described with reference to FIG. 10.

At 1315, the method may include performing a first blind detection on the control channel candidate and a second blind detection on the control channel candidate based at least in part on the set of repetition levels and the blind detection threshold, where the first blind detection and the second blind detection are associated with different repetition levels of the set of repetition levels. The operations of 1315 may be performed in accordance with examples as disclosed herein. In some examples, aspects of the operations of 1315 may be performed by a blind detection component 1035 as described with reference to FIG. 10.

At 1320, the method may include receiving the DCI in accordance with the at least one blind detection. The operations of 1320 may be performed in accordance with examples as disclosed herein. In some examples, aspects of the operations of 1325 may be performed by a control information receiver 1040 as described with reference to FIG. 10.

Figure 14:
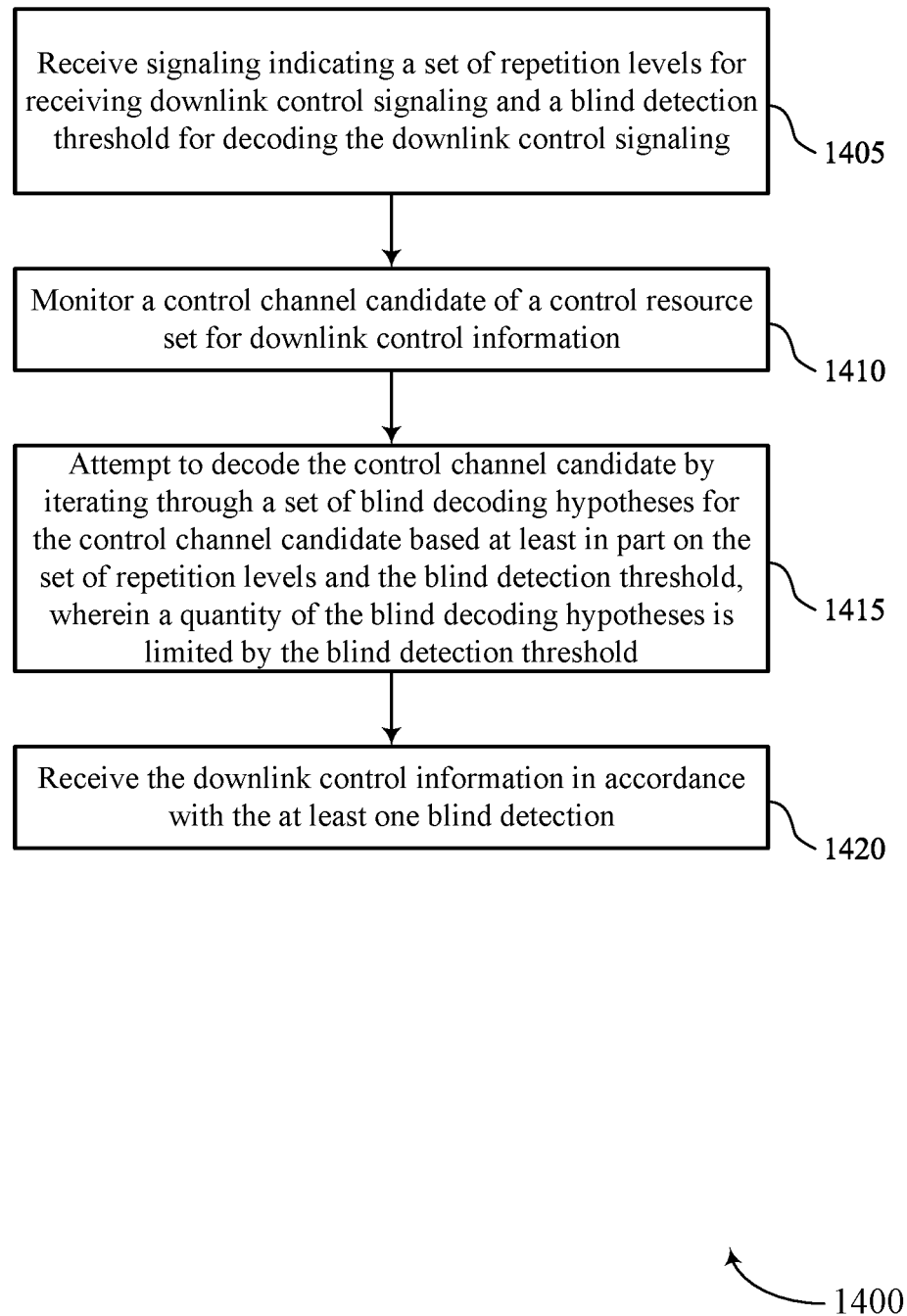

FIG. 14 shows a flowchart illustrating a method 1400 that supports techniques to increase coverage for low capability UEs in accordance with aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1405, the method may include receiving signaling indicating a set of repetition levels for receiving downlink control signaling and a blind detection threshold for decoding the downlink control signaling. The operations of 1405 may be performed in accordance with examples as disclosed herein. In some examples, aspects of the operations of 1405 may be performed by a control channel repetition component 1025 as described with reference to FIG. 10.

At 1410, the method may include monitoring a control channel candidate of a CORESET for DCI. The operations of 1410 may be performed in accordance with examples as disclosed herein. In some examples, aspects of the operations of 1410 may be performed by a monitoring component 1030 as described with reference to FIG. 10.

At 1415, the method may include attempting to decode the control channel candidate by iterating through a set of blind decoding hypotheses for the control channel candidate based at least in part on the set of repetition levels and the blind detection threshold, where a quantity of the blind decoding hypotheses is limited by the blind detection threshold. The operations of 1415 may be performed in accordance with examples as disclosed herein. In some examples, aspects of the operations of 1415 may be performed by a blind detection component 1035 as described with reference to FIG. 10.

At 1420, the method may include receiving the DCI in accordance with the at least one blind detection. The operations of 1420 may be performed in accordance with examples as disclosed herein. In some examples, aspects of the operations of 1425 may be performed by a control information receiver 1040 as described with reference to FIG. 10.

Figure 15:
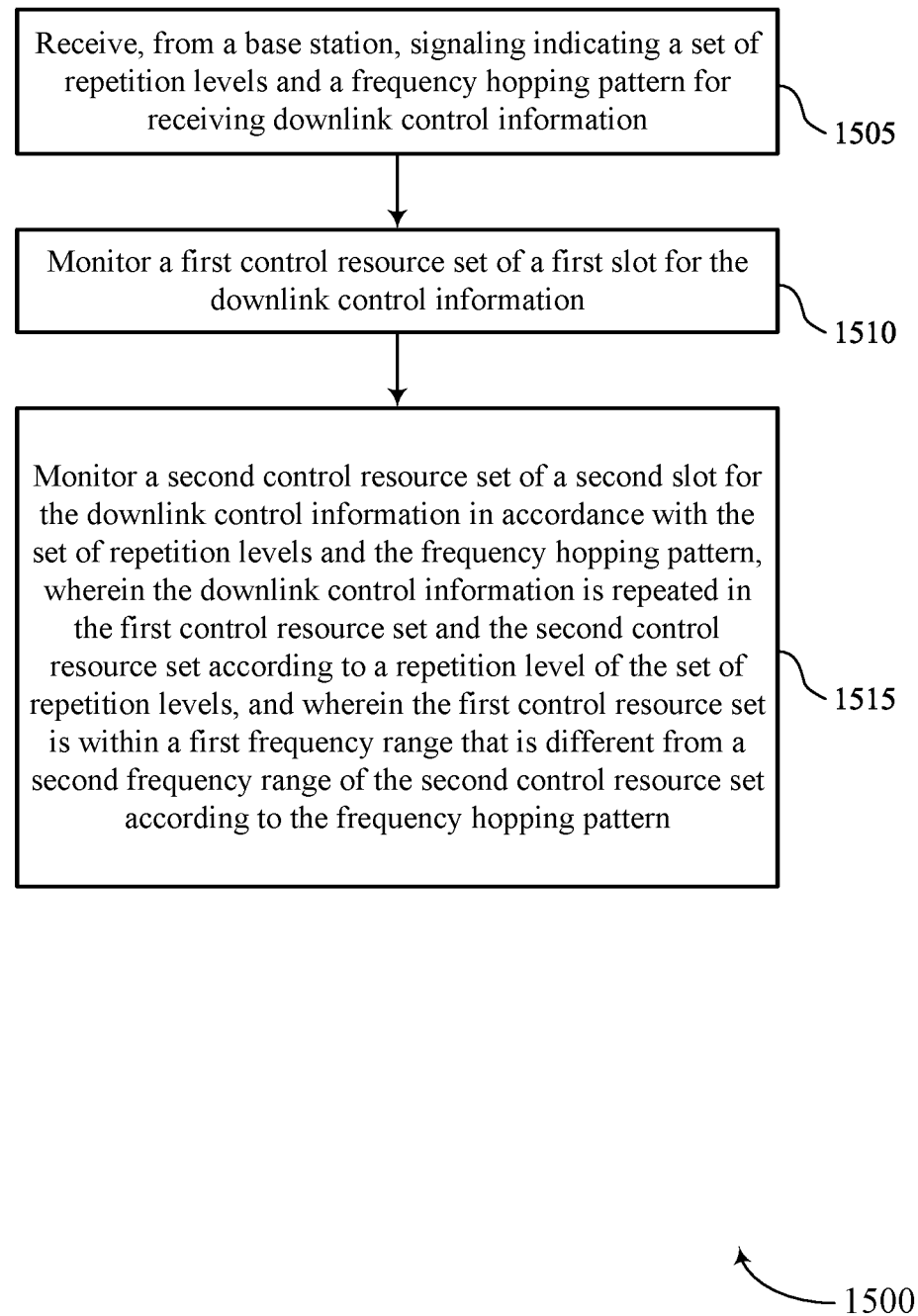

FIG. 15 shows a flowchart illustrating a method 1500 that supports techniques to increase coverage for low capability UEs in accordance with aspects of the present disclosure. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, signaling indicating a set of repetition levels and a frequency hopping pattern for receiving DCI. The operations of 1505 may be performed in accordance with examples as disclosed herein. In some examples, aspects of the operations of 1505 may be performed by a frequency hopping component 1045 as described with reference to FIG. 10.

At 1510, the method may include monitoring a first CORESET of a first slot for the DCI. The operations of 1510 may be performed in accordance with examples as disclosed herein. In some examples, aspects of the operations of 1510 may be performed by a monitoring component 1030 as described with reference to FIG. 10.

At 1515, the method may include monitoring a second CORESET of a second slot for the DCI in accordance with the set of repetition levels and the frequency hopping pattern, where the DCI is repeated in the first CORESET and the second CORESET according to a repetition level of the set of repetition levels, and where the first CORESET is within a first frequency range that is different from a second frequency range of the second CORESET according to the frequency hopping pattern. The operations of 1515 may be performed in accordance with examples as disclosed herein. In some examples, aspects of the operations of 1515 may be performed by a monitoring component 1030 as described with reference to FIG. 10.

Figure 16:
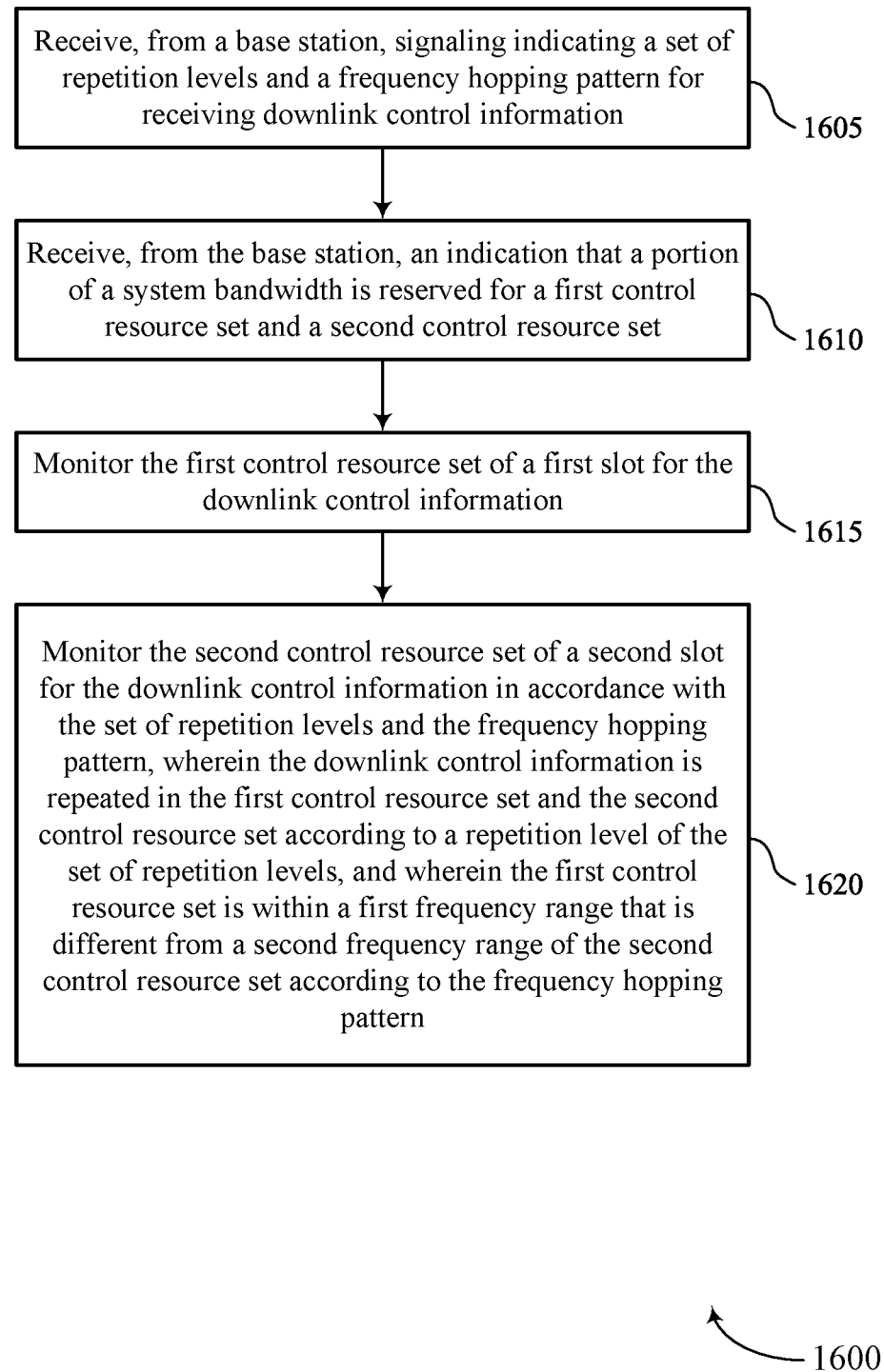

FIG. 16 shows a flowchart illustrating a method 1600 that supports techniques to increase coverage for low capability UEs in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, signaling indicating a set of repetition levels and a frequency hopping pattern for receiving DCI. The operations of 1605 may be performed in accordance with examples as disclosed herein. In some examples, aspects of the operations of 1605 may be performed by a frequency hopping component 1045 as described with reference to FIG. 10.

At 1610, the method may include receiving, from the base station, an indication that a portion of a system bandwidth is reserved for a first CORESET and a second CORESET. The operations of 1610 may be performed in accordance with examples as disclosed herein. In some examples, aspects of the operations of 1610 may be performed by a CORESET component 1050 as described with reference to FIG. 10.

At 1615, the method may include monitoring the first CORESET of a first slot for the DCI. The operations of 1615 may be performed in accordance with examples as disclosed herein. In some examples, aspects of the operations of 1615 may be performed by a monitoring component 1030 as described with reference to FIG. 10.

At 1620, the method may include monitoring the second CORESET of a second slot for the DCI in accordance with the set of repetition levels and the frequency hopping pattern, where the DCI is repeated in the first CORESET and the second CORESET according to a repetition level of the set of repetition levels, and where the first CORESET is within a first frequency range that is different from a second frequency range of the second CORESET according to the frequency hopping pattern. The operations of 1620 may be performed in accordance with examples as disclosed herein. In some examples, aspects of the operations of 1620 may be performed by a monitoring component 1030 as described with reference to FIG. 10.

The following provides an overview of aspects of the present disclosure:

Aspect 1: A method for wireless communication at a UE, comprising: receiving signaling indicating a set of repetition levels for receiving downlink control signaling and a blind detection threshold for decoding the downlink control signaling; monitoring a control channel candidate of a CORESET for DCI; performing at least one blind detection on the control channel candidate to decode the DCI based at least in part on the set of repetition levels and the blind detection threshold; and receiving the DCI in accordance with the at least one blind detection.

Aspect 2: The method of aspect 1, wherein performing the at least one blind detection on the control channel candidate comprises: performing a first blind detection on the control channel candidate and a second blind detection on the control channel candidate, wherein the first blind detection and the second blind detection are associated with different repetition levels of the set of repetition levels.

Aspect 3: The method of any of aspects 1 and 2, wherein performing the at least one blind detection on the control channel candidate comprises: attempting to decode the control channel candidate by iterating through a set of blind decoding hypotheses for the control channel candidate, wherein a quantity of the blind decoding hypotheses is limited by the blind detection threshold.

Aspect 4: The method of aspect 3, wherein each blind decoding hypothesis of the set of blind decoding hypotheses is associated with a different subset of one or more repetition levels from the set of repetition levels.

Aspect 5: The method of any of aspects 3 and 4, wherein iterating through the set of blind decoding hypotheses comprises: skipping a subset of the set of blind decoding hypotheses associated with a corresponding subset of repetition levels when a quantity of blind decoding hypotheses attempted by the UE for the control channel candidate reaches the blind detection threshold.

Aspect 6: The method of aspect 5, wherein the corresponding subset of repetition levels is a subset of lowest repetition levels of the set of repetition levels.

Aspect 7: The method of any of aspects 1 through 6, wherein the signaling indicating the set of repetition levels and the blind detection threshold comprises RRC signaling.

Aspect 8: A method for wireless communication at a UE, comprising: receiving, from a base station, signaling indicating a set of repetition levels and a frequency hopping pattern for receiving DCI; monitoring a first CORESET of a first slot for the DCI; and monitoring a second CORESET of a second slot for the DCI in accordance with the set of repetition levels and the frequency hopping pattern, wherein the DCI is repeated in the first CORESET and the second CORESET according to a repetition level of the set of repetition levels, and wherein the first CORESET is within a first frequency range that is different from a second frequency range of the second CORESET according to the frequency hopping pattern.

Aspect 9: The method of aspect 8, further comprising: receiving, from the base station, an indication that a portion of a system bandwidth is reserved for the first CORESET and the second CORESET.

Aspect 10: The method of any of aspects 8 and 9, further comprising: receiving, from the base station, an indication that the DCI is mapped to the first CORESET or the second CORESET using a non-interleaved mapping technique and that resources associated with a first set of consecutive CCE indices are allocated for the first CORESET and resources associated with a second set of consecutive CCE indices are allocated for the second CORESET, wherein the allocation of the first CORESET and the second CORESET is based at least in part on the non-interleaved mapping technique.

Aspect 11: The method of aspect 10, wherein the first CORESET and the second CORESET are located at opposite ends of a frequency range associated with a system bandwidth.

Aspect 12: The method of any of aspects 10 through 11, further comprising: receiving, from the base station, a plurality of DMRSs over the first CORESET or the second CORESET, the plurality of DMRSs associated with a same precoder as a second plurality of DMRSs associated with a third CORESET, the third CORESET spanning a frequency that is greater than the first CORESET and the second CORESET.

Aspect 13: The method of any of aspects 8 and 9, further comprising: receiving, from the base station, an indication that the DCI is mapped to the first CORESET or the second CORESET using an interleaved mapping technique and that resources associated with a first set of consecutive even CCE indices are allocated for the first CORESET and resources associated with a second set of consecutive odd CCE indices are allocated for the second CORESET, wherein the allocation of the first CORESET and the second CORESET is based at least in part on the interleaved mapping technique.

Aspect 14: The method of aspect 13, further comprising: receiving, from the base station, a plurality of DMRSs over the first CORESET or the second CORESET, the plurality of DMRSs associated with a same precoder as a second plurality of DMRSs associated with a third CORESET, the third CORESET spanning a frequency that is greater than the first CORESET and the second CORESET.

Aspect 15: The method of any of aspects 8 through 14, further comprising: switching from monitoring the first CORESET in the first slot to monitoring the second CORESET in the second slot after a duration based at least in part on the frequency hopping pattern, the duration lasting from an end of the first CORESET to a start of the second slot.

Aspect 16: The method of any of aspects 8 through 15, wherein the signaling indicating the set of repetition levels and the frequency hopping pattern comprises RRC signaling.

Aspect 17: An apparatus for wireless communication at a UE, comprising at least one processor; memory coupled with the at least one processor; and instructions stored in the memory and executable by the at least one processor to cause the UE to perform a method of any of aspects 1 through 7.

Aspect 18: An apparatus for wireless communication at a UE, comprising at least one means for performing a method of any of aspects 1 through 7.

Aspect 19: A non-transitory computer-readable medium storing code for wireless communication at a UE, the code comprising instructions executable by at least one processor to perform a method of any of aspects 1 through 7.

Aspect 20: An apparatus for wireless communication at a UE, comprising at least one processor; memory coupled with the at least one processor; and instructions stored in the memory and executable by the at least one processor to cause the UE to perform a method of any of aspects 8 through 16.

Aspect 21: An apparatus for wireless communication at a UE, comprising at least one means for performing a method of any of aspects 8 through 16.

Aspect 22: A non-transitory computer-readable medium storing code for wireless communication at a UE, the code comprising instructions executable by at least one processor to perform a method of any of aspects 8 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving signaling indicating a set of repetition levels for receiving downlink control signaling and a blind detection threshold for decoding the downlink control signaling;
monitoring a control channel candidate of a control resource set for downlink control information;
performing at least one blind detection on the control channel candidate to decode the downlink control information based at least in part on the set of repetition levels and the blind detection threshold, wherein the performing comprises attempting to decode the control channel candidate by iterating through a set of blind decoding hypotheses for the control channel candidate, wherein a quantity of the blind decoding hypotheses is limited by the blind detection threshold and the iterating through the set of blind decoding hypotheses comprises skipping a subset of the set of blind decoding hypotheses associated with a corresponding subset of repetition levels when a quantity of blind decoding hypotheses attempted by the UE for the control channel candidate reaches the blind detection threshold; and receiving the downlink control information in accordance with the at least one blind detection.

2. The method of claim 1, wherein the performing the at least one blind detection on the control channel candidate further comprises:

performing a first blind detection on the control channel candidate and a second blind detection on the control channel candidate, wherein the first blind detection and the second blind detection are associated with different repetition levels of the set of repetition levels.

3. The method of claim 1, wherein each blind decoding hypothesis of the set of blind decoding hypotheses is associated with a different subset of one or more repetition levels from the set of repetition levels.

4. The method of claim 1, wherein the corresponding subset of repetition levels is a subset of lowest repetition levels of the set of repetition levels.

5. The method of claim 1, wherein the signaling indicating the set of repetition levels and the blind detection threshold comprises radio resource control signaling.

6. A method for wireless communication at a user equipment (UE), comprising:

receiving, from a base station, signaling indicating a set of repetition levels and a frequency hopping pattern for receiving downlink control information;

monitoring a first control resource set of a first slot for the downlink control information;

monitoring a second control resource set of a second slot for the downlink control information in accordance with the set of repetition levels and the frequency hopping pattern, wherein the downlink control information is repeated in the first control resource set and the second control resource set according to a repetition level of the set of repetition levels, and wherein the first control resource set is within a first frequency range that is different from a second frequency range of the second control resource set according to the frequency hopping pattern; and performing at least one blind detection on a control channel candidate, of the first control resource set, or of the second control resource set, to decode the downlink control information based at least in part on the set of repetition levels and a blind detection threshold, wherein the performing comprises attempting to decode the control channel candidate by iterating through a set of blind decoding hypotheses for the control channel candidate, wherein a quantity of blind decoding hypotheses is limited by the blind detection threshold and the iterating through the set of blind decoding hypotheses comprises skipping a subset of the set of blind decoding hypotheses associated with a corresponding subset of repetition levels when a quantity of blind decoding hypotheses attempted by the UE for the control channel candidate reaches the blind detection threshold.

7. The method of claim 6, further comprising:

receiving, from the base station, an indication that a portion of a system bandwidth is reserved for the first control resource set and the second control resource set.

8. The method of claim 6, further comprising:

receiving, from the base station, an indication that the downlink control information is mapped to the first control resource set or the second control resource set using a non-interleaved mapping technique and that resources associated with a first set of consecutive control channel element indices are allocated for the first control resource set and resources associated with a second set of consecutive control channel element indices are allocated for the second control resource set, wherein the allocation for the first control resource set and the second control resource set is based at least in part on the non-interleaved mapping technique.

9. The method of claim 8, wherein the first control resource set and the second control resource set are located at opposite ends of a frequency range associated with a system bandwidth.

10. The method of claim 8, further comprising:

receiving, from the base station, a plurality of demodulation reference signals over the first control resource set or the second control resource set, the plurality of demodulation reference signals associated with a same precoder as a second plurality of demodulation reference signals associated with a third control resource set, the third control resource set spanning a frequency that is greater than the first control resource set and the second control resource set.

11. The method of claim 6, further comprising:

receiving, from the base station, an indication that the downlink control information is mapped to the first control resource set or the second control resource set using an interleaved mapping technique and that resources associated with a first set of consecutive even control channel element indices are allocated for the first control resource set and resources associated with a second set of consecutive odd control channel element indices are allocated for the second control resource set, wherein the allocation for the first control resource set and the second control resource set is based at least in part on the interleaved mapping technique.

12. The method of claim 11, further comprising:

receiving, from the base station, a plurality of demodulation reference signals over the first control resource set or the second control resource set, the plurality of demodulation reference signals associated with a same precoder as a second plurality of demodulation reference signals associated with a third control resource set, the third control resource set spanning a frequency that is greater than the first control resource set and the second control resource set.

13. The method of claim 6, further comprising:

switching from monitoring the first control resource set in the first slot to monitoring the second control resource set in the second slot after a duration based at least in part on the frequency hopping pattern, the duration lasting from an end of the first control resource set to a start of the second slot.

14. The method of claim 6, wherein the signaling indicating the set of repetition levels and the frequency hopping pattern comprises radio resource control signaling.

15. An apparatus for wireless communication at a user equipment (UE), comprising:

at least one processor;
memory coupled with the at least one processor; and
instructions stored in the memory and executable by the at least one processor to cause the UE to:
receive signaling indicating a set of repetition levels for receiving downlink control signaling and a blind detection threshold for decoding the downlink control signaling;

monitor a control channel candidate of a control resource set for downlink control information;

perform at least one blind detection on the control channel candidate to decode the downlink control information based at least in part on the set of repetition levels and the blind detection threshold, wherein the performing comprises attempting to decode the control channel candidate by iterating through a set of blind decoding hypotheses for the control channel candidate, wherein a quantity of the blind decoding hypotheses is limited by the blind detection threshold and the iterating through the set of blind decoding hypotheses comprises skipping a subset of the set of blind decoding hypotheses associated with a corresponding subset of repetition levels when a quantity of blind decoding hypotheses attempted by the UE for the control channel candidate reaches the blind detection threshold; and receive the downlink control information in accordance with the at least one blind detection.

16. The apparatus of claim 15, wherein the instructions to perform the at least one blind detection on the control channel candidate are further executable by the at least one processor to cause the UE to:

perform a first blind detection on the control channel candidate and a second blind detection on the control channel candidate, wherein the first blind detection and the second blind detection are associated with different repetition levels of the set of repetition levels.

17. The apparatus of claim 15, wherein each blind decoding hypothesis of the set of blind decoding hypotheses is associated with a different subset of one or more repetition levels from the set of repetition levels.

18. The apparatus of claim 15, wherein the corresponding subset of repetition levels is a subset of lowest repetition levels of the set of repetition levels.

19. An apparatus for wireless communication at a user equipment (UE), comprising:

at least one processor;

memory coupled with the at least one processor; and instructions stored in the memory and executable by the at least one processor to cause the UE to:

receive, from a base station, signaling indicating a set of repetition levels and a frequency hopping pattern for receiving downlink control information;

monitor a first control resource set of a first slot for the downlink control information;

monitor a second control resource set of a second slot for the downlink control information in accordance with the set of repetition levels and the frequency hopping pattern, wherein the downlink control information is repeated in the first control resource set and the second control resource set according to a repetition level of the set of repetition levels, and wherein the first control resource set is within a first frequency range that is different from a second frequency range of the second control resource set according to the frequency hopping pattern; and perform at least one blind detection on a control channel candidate, of the first control resource set, or of the second control resource set, to decode the downlink control information based at least in part on the set of repetition levels and a blind detection threshold, wherein the performing comprises attempting to decode the control channel candidate by iterating through a set of blind decoding hypotheses for the control channel candidate, wherein a quantity of blind decoding hypotheses is limited by the blind detection threshold and the iterating through the set of blind decoding hypotheses comprises skipping a subset of the set of blind decoding hypotheses associated with a corresponding subset of repetition levels when a quantity of blind decoding hypotheses attempted by the UE for the control channel candidate reaches the blind detection threshold.

20. The apparatus of claim 19, wherein the instructions are further executable by the at least one processor to cause the UE to:

receive, from the base station, an indication that a portion of a system bandwidth is reserved for the first control resource set and the second control resource set.

21. The apparatus of claim 19, wherein the instructions are further executable by the at least one processor to cause the UE to:

receive, from the base station, an indication that the downlink control information is mapped to the first control resource set or the second control resource set using a non-interleaved mapping technique and that resources associated with a first set of consecutive control channel element indices are allocated for the first control resource set and resources associated with a second set of consecutive control channel element indices are allocated for the second control resource set, wherein the allocation for the first control resource set and the second control resource set is based at least in part on the non-interleaved mapping technique.

22. The apparatus of claim 21, wherein the first control resource set and the second control resource set are located at opposite ends of a frequency range associated with a system bandwidth.

23. The apparatus of claim 21, wherein the instructions are further executable by the at least one processor to cause the UE to:

receive, from the base station, a plurality of demodulation reference signals over the first control resource set or the second control resource set, the plurality of demodulation reference signals associated with a same precoder as a second plurality of demodulation reference signals associated with a third control resource set, the third control resource set spanning a frequency that is greater than the first control resource set and the second control resource set.

24. The apparatus of claim 19, wherein the instructions are further executable by the at least one processor to cause the UE to:

receive, from the base station, an indication that the downlink control information is mapped to the first control resource set or the second control resource set using an interleaved mapping technique and that resources associated with a first set of consecutive even control channel element indices are allocated for the first control resource set and resources associated with a second set of consecutive odd control channel element indices are allocated for the second control resource set, wherein the allocation for the first control resource set and the second control resource set is based at least in part on the interleaved mapping technique.

25. The apparatus of claim 24, wherein the instructions are further executable by the at least one processor to cause the UE to:

receive, from the base station, a plurality of demodulation reference signals over the first control resource set or the second control resource set, the plurality of demodulation reference signals associated with a same precoder as a second plurality of demodulation reference signals associated with a third control resource set, the third control resource set spanning a frequency that is greater than the first control resource set and the second control resource set.

26. The apparatus of claim 19, wherein the instructions are further executable by the at least one processor to cause the UE to:

switch from monitoring the first control resource set in the first slot to monitoring the second control resource set in the second slot after a duration based at least in part on the frequency hopping pattern, the duration lasting from an end of the first control resource set to a start of the second slot.

\* \* \* \* \*